(12) United States Patent
Ji et al.

(10) Patent No.: US 12,003,203 B2
(45) Date of Patent: Jun. 4, 2024

(54) MODEL PREDICTIVE DECOMPOSITION CONTROL METHOD AND DEVICE FOR OPEN-WINDING FIVE-PHASE PERMANENT MAGNET SYNCHRONOUS MOTOR

(71) Applicant: JIANGSU UNIVERSITY, Zhenjiang (CN)

(72) Inventors: Jinghua Ji, Zhenjiang (CN); Yuxuan Du, Zhenjiang (CN); Wenxiang Zhao, Zhenjiang (CN); Linsen Huang, Zhenjiang (CN); Tao Tao, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 108 days.

(21) Appl. No.: 17/639,336

(22) PCT Filed: Dec. 4, 2020

(86) PCT No.: PCT/CN2020/133913
§ 371 (c)(1),
(2) Date: Feb. 28, 2022

(87) PCT Pub. No.: WO2022/110277
PCT Pub. Date: Jun. 2, 2022

(65) Prior Publication Data
US 2023/0163710 A1      May 25, 2023

(30) Foreign Application Priority Data

Nov. 26, 2020   (CN) .......................... 202011347430.2

(51) Int. Cl.
H02P 27/08      (2006.01)
(52) U.S. Cl.
CPC ................................. H02P 27/085 (2013.01)

(58) Field of Classification Search
CPC .......... H02P 27/085; H02P 25/22; H02P 21/14
See application file for complete search history.

(56) References Cited

U.S. PATENT DOCUMENTS 5,227,709 A        7/1993   Gauthier et al.
2021/0399664 A1*  12/2021   Zhao ....................... H02P 27/12

FOREIGN PATENT DOCUMENTS

CN        104753382 A     7/2015
CN        105958885 A     9/2016
(Continued)

OTHER PUBLICATIONS

Wenxiang Zhao, et al., Unity Power Factor Fault-Tolerant Control of Linear Permanent-Magnet Vernier Motor Fed by a Floating Bridge Multilevel Inverter With Switch Fault, IEEE Transactions on Industrial Electronics, 2018, pp. 9113-9123, vol. 65, No. 11.

*Primary Examiner* — Said Bouziane
(74) *Attorney, Agent, or Firm* — Bayramoglu Law Offices LLC

(57) ABSTRACT

A model predictive decomposition control method and device for an open-winding five-phase permanent magnet synchronous motor is provided. The method includes obtaining the voltage component in the stationary coordinate system under the orientation of the rotor magnetic field, synthesizing the virtual voltage vector that can eliminate the voltage vector in harmonic space according to the vector distribution of the five-phase permanent magnet synchronous motor under the voltage source inverter. The open winding permanent magnet synchronous motor topology is equivalent to the superposition of the independent actions of two inverters. The voltage vector generated by a single inverter is predicted through the mathematical model of the motor. The expected increment is a judgment condition to determine whether the open winding system uses one of the two inverters to maintain the normal operation of the open (Continued)

winding system, or the first inverter is clamped and the second inverter generates the remaining increment.

6 Claims, 15 Drawing Sheets

(56) References Cited

FOREIGN PATENT DOCUMENTS

| | | | |
|---|---|---|---|
| CN | 107196573 | A | 9/2017 |
| CN | 109995287 | A | 7/2019 |
| CN | 110311600 | A | 10/2019 |
| CN | 110707975 | A | 1/2020 |
| CN | 110729935 | A | 1/2020 |

* cited by examiner

MODEL PREDICTIVE DECOMPOSITION CONTROL METHOD AND DEVICE FOR OPEN-WINDING FIVE-PHASE PERMANENT MAGNET SYNCHRONOUS MOTOR

CROSS REFERENCE TO THE RELATED APPLICATIONS

This application is the national phase entry of International Application No. PCT/CN2020/133913, filed on Dec. 4, 2020, which is based upon and claims priority to Chinese Patent Application No. 202011347430.2, filed on Nov. 26, 2020, the entire contents of which are incorporated herein by reference.

TECHNICAL FIELD

The present invention belongs to the application field of a multi-phase motor open-winding topology system and relates to a model predictive decomposition control method and device for an open-winding five-phase permanent magnet synchronous motor.

BACKGROUND

The five-phase permanent magnet synchronous motor has the advantages of high efficiency, high power density, wide speed range, low torque ripple, and strong fault tolerance. The five-phase PMSM has been widely concerned and applied in aerospace, electric vehicles, and ship propulsion systems. At the same time, the open-winding motor topology system has excellent characteristics such as high output power, diverse power supply modes and voltage vector modulation methods, flexible control, redundancy, and fault tolerance.

Some researches in domestic and foreign have achieved specific results in the model predictive control method of the five-phase permanent magnet synchronous motor under the open-winding topology. The Chinese invention patent "A Model Predictive Current Control Method for Open Winding Permanent Magnet Synchronous Motors" (Patent No.: CN201910583770.6) discloses a control method for model prediction of open winding permanent magnet synchronous motors. This method uses a single power supply. Although the cost is saved, a zero-sequence current loop will inevitably be generated, and the flexibility of the open-winding system is not fully utilized at the same time. The Chinese invention patent "An Optimal Model Predictive Control Method for Dual Inverter Open Winding Induction Motors" (Patent No.: CN201910207446.4) discloses a control method optimized for the prediction of dual inverter open winding induction motors. Since this method only acts on one voltage vector for every control period, the characteristic is easy to implement but has poor steady-state performance. Therefore, the existing open-winding model prediction methods mostly use the same modulation method as the non-open-winding topology system but fails to take full advantage of the flexibility of the open-winding motor drive system and the advantages of numeric voltage vectors. At the same time, as the number of motor phases increases, especially the open-winding five-phase permanent magnet synchronous motor topology system, the switching loss of the drive system doubles. The control is flexible but complicated. Therefore, under the premise of maintaining the flexibility and freedom of the open-winding five-phase permanent magnet synchronous motor system, the main purpose of the present invention is reduce the switching loss of the inverter, and the calculation of the open-winding model prediction.

SUMMARY

The purpose of the present invention: Because of the problems in the prior technology, a model predictive decomposition control method and device for an open-winding five-phase permanent magnet synchronous motor is proposed, regarding the two inverters of the open-winding topology system as two independent units, takes the voltage vector provided by inverter 1 as the starting point, and selects different inverter switching sequences according to the needs of the open winding system under different working conditions. Under the premise of ensuring the port performance, the present invention can effectively reduce the switching times of the open winding five-phase permanent magnet synchronous motor control system to reduce the switching loss of the inverter.

Technical solution: To achieve the purpose as mentioned above of the present invention, the technical solution adopted by the present invention is as follows:

A model predictive decomposition control method for an open-winding five-phase permanent magnet synchronous motor includes the following steps:

Step 1) Obtaining q-axis and d-axis currents in a fundamental space of the open-winding five-phase permanent magnet synchronous motor in a rotating coordinate system as the given of a control system.

Step 2) Constructing a virtual voltage vector table of the open-winding five-phase permanent magnet synchronous motor in a static coordinate system. Applying a label of the virtual voltage vector in a previous control cycle and calculating voltage in the static coordinate system. Moreover, solving a back electromotive force of the motor according to a mathematical model of the motor;

Step 3) Using an Euler forward difference prediction equation to find a q-axis current and a d-axis current in this period;

Step 4) Substituting the voltage vector generated by inverter 1 as given in a current sampling period into the prediction model and cost function to find the currents of the q-axis and the d-axis of the rotating coordinate system in the next period. If the voltage vector provided by inverter 1 meets the requirements of the drive system, close inverter 2. Otherwise, clamping inverter 1 to the maximum available voltage vector, and open inverter 2 to provide the increment of the remaining part;

Step 5) Transmitting the selected voltage vector and its corresponding duty cycle signal the open-winding inverter to complete the closed-loop control of the drive system.

Further, the specific steps of Step 1) include: calculating a given speed n* and an actual speed n of the motor to obtain a required q-axis current reference value $i_q^*$ by the proportional-integral controller. Moreover, the d-axis current reference value $i_d^*=0$.

Further, the specific steps of Step 2) include:

Step 2.1) Constructing an open-winding five-phase permanent magnet synchronous motor virtual voltage vector table;

Expressing the voltage vector generated by the five-phase voltage source inverter in the stationary coordinate system as:

$$u_s = \frac{2}{5} \times (s_a + s_b w + s_c w^2 + s_d w^3 + s_e w^4) \times U_{dc}$$

$$\left(w = e^{j\frac{2}{5}\pi}\right)$$

wherein, $U_{dc}$ is the DC bus voltage, $u_s$ is the voltage vector value in the static coordinate system, $s_i$(i=a,b,c,d,e) is the switching state of each bridge arm, when the upper bridge arm is turned on, $s_i$=1, when the lower bridge arm is turned on, $s_i$=0;

Step 2.2) According to the size of the modulus length, divide the voltage vector obtained from Step 1) into large vector $u_B$, medium vector $u_M$, small vector $u_L$, and zero vector $u_O$. According to the principle that the harmonic subspace is equivalent to zero, constructing the virtual voltage vectors of the open winding five-phase permanent magnet synchronous:

$$VV_i(u_B, u_L) = 0.618 \times u_M + (1-0.618) \times u_B$$

wherein the scale factor 0.618 of the two voltage vectors makes the voltage vector of a five-phase permanent magnet synchronous motor equivalent to zero in the harmonic subspace;

Step 2.3) Expressing the voltage vector output value of the previous sampling period (k−1) as:

$$u_s(k-1) = \frac{2}{5} \times (s_a(k-1) + s_b(k-1)w + s_c(k-1)w^2 + s_d(k-1)w^3 + s_e(k-1)w^4) \times U_{dc}$$

$$\left(w = e^{j\frac{2}{5}\pi}\right)$$

Furthermore, the $i_q^*$ and a actual speed to of the motor are calculated using Step 1). Hence, the instantaneous value of the q-axis and the d-axis back electromotive force of the open-winding five-phase permanent magnet synchronous motor in the rotating coordinate system at this time is expressed as:

$$\begin{cases} EMF_d = \omega \times L_s \times i_q^* \\ EMF_q = \omega \times L_s \times i_d^* + \omega \times \varphi_f \end{cases}$$

wherein Ls is the inductance of the motor, $\varphi_f$ is the permanent magnet flux linkage of the motor, iq* is the q-axis current reference value in the rotating coordinate system, and id* is the d-axis current reference value in the rotating coordinate system.

Further, the specific steps of Step 3) include:

Step 3.1) Expressing the voltage equation in the rotating coordinate system of the five-phase permanent magnet synchronous motor as:

$$\begin{cases} \frac{di_d}{dt} = \frac{1}{L_s} \times (u_d - R_s \times i_d - \omega_e \times L_s \times i_q) \\ \frac{di_q}{dt} = \frac{1}{L_s} \times (u_d - R_s \times i_d - \omega_e \times L_s \times i_d - \omega_e \times \varphi_f) \end{cases}$$

wherein, $L_s$ is the inductance of the motor, $R_s$ is the stator resistance of the motor, $u_d$ is the voltage on the d-axis, $u_q$ is the voltage on the q-axis, $i_d$ is the d-axis current, and $i_q$ is the q-axis current, $\omega_e$ is the electrical angle of the motor, $\varphi_f$ is the permanent magnet flux linkage of the motor;

Step 3.2) Using an Euler forward difference method to find the currents of the q-axis and d-axis in the rotating coordinate system at time k+1:

$$\begin{cases} \frac{i_d(k+1) - i_d(k)}{Ts} = \frac{1}{L_s} \times (u_d(k) - R_s \times i_d(k) - EMF_d(k)) \\ \frac{i_q(k+1) - i_q(k)}{Ts} = \frac{1}{L_s} \times (u_q(k) - R_s \times i_q(k) - EMF_q(k)) \end{cases}$$

wherein, $u_d(k)$ is the voltage on the d-axis at time k, $u_q(k)$ is the voltage on the q-axis at time k, $i_d(k)$ is the d-axis current, and $i_q(k)$ is the q-axis current, $EMF_d(k)$ is the d-axis back EMF of the motor at time k, and $EMF_q(k)$ is the q-axis back EMF of the motor at time k.

Further, the specific steps of Step 4) include:

Step 4.1) According to the mathematical model of open-winding five-phase permanent magnet synchronous motor, the currents of the q-axis and the d-axis in the rotating coordinate system at time k+1 is the sum of two inverters:

$$\begin{cases} u_d(k+1) = u_d^{INV1}(k+1) - u_d^{INV2}(k+1) \\ u_q(k+1) = u_q^{INV1}(k+1) - u_q^{INV2}(k+1) \end{cases}$$

wherein, $u_d^{INV1}(k+1)$ is the d-axis voltage in the rotating coordinate system provided by inverter 1 at k+1 instance, $u_q^{INV1}(k+1)$ is the q-axis voltage in the rotating coordinate system provided by inverter 1 at k+1 instance, $u_d^{INV2}(k+1)$ is the d-axis voltage in the rotating coordinate system provided by inverter 2 at k+1 instance, $u_q^{INV2}(k+1)$ is the q-axis voltage in the rotating coordinate system provided by inverter 2 at k+1 instance;

Step 4.2) Expressing the voltage vectors provided by inverter 1 and inverter 2 as:

$$\begin{cases} \Delta i_d^{INV1} = \frac{Ts}{L_s} \times (u_d^{INV1}(k+1) - R_s \times i_d(k+1) - EMF_d(k+1)) \\ \Delta i_q^{INV1} = \frac{Ts}{L_s} \times (u_d^{INV1}(k+1) - R_s \times i_q(k+1) - EMF_q(k+1)) \end{cases}$$

$$\begin{cases} \Delta i_d^{INV2} = -\frac{Ts}{L_s} \times u_d^{INV2}(k+1) \\ \Delta i_q^{INV2} = -\frac{Ts}{L_s} \times u_d^{INV2}(k+1) \end{cases}$$

wherein, $\Delta i_d^{INV1}$ and $\Delta i_q^{INV1}$ are d-axis current and q-axis currents in the rotating coordinate system generated by the inverter 1. Rs is the phase resistance of the motor windings. Ts is the control period of the controller. Ls is the stator inductance of the motor. $EMF_d(k+1)$ is the d-axis back-EMF of the motor at the k+1 instance. $EMF_q(k+1)$ is the q-axis back-EMF of the motor at the k+1 instance;

Step 4.3) If a $\Delta i_d^{INV1}$ and a $\Delta i_q^{INV1}$ is greater than or equal to the incremental requirement $\Delta i_d^*$ and $\Delta i_q^*$ at this moment, the voltage vector provided by inverter 1 is enough, and the inverter 2 is turn off. By applying multiple voltage vectors in one control period, express the voltage vector in the rotating coordinate system generated in the current sampling period as:

$$\begin{cases} u_\alpha^{INV1} = DR0_{INV1} \times (DR_{INV1} \times \text{real}(VV_i^{INV1}) + \\ \qquad (1 - DR_{INV1}) \times \text{real}(VV_j^{INV1})) \\ u_\beta^{INV1} = DR0_{INV1} \times (DR_{INV1} \times \text{imag}(VV_i^{INV1}) + \\ \qquad (1 - DR_{INV1}) \times \text{imag}(VV_j^{INV1})) \end{cases}$$

$$\begin{cases} u_\alpha^{INV2} = 0 \\ u_\beta^{INV2} = 0 \end{cases}$$

wherein, u α, u β, u α, and u β are the voltage vector in the stationary coordinate system selected by inverter 1 and inverter 2, respectively, distinguishing by superscripts; real($VV_i^{INV1}$) and imag($VV_i^{INV1}$) are the real and imaginary parts of the first virtual voltage vector to be selected by inverter 1 at this moment. real($VV_j^{INV1}$) and imag($VV_j^{INV1}$) are the real and imaginary parts of the second voltage vector to be selected by inverter 1. $DR0_{INV1}$ is the scale factors for the sum of the effective voltage vectors of inverter 1; $DR_{INV1}$ is the scale factor between two effective voltage vectors inverter 1;

Expressing the scale factors of inverter 1 and inverter 2 when the increment provided by inverter 1 meets the current needs as:

$$\begin{cases} DR0_{INV1} = m(0 \le m \le 1) \\ DR_{INV1} = n(0 \le n \le 1) \end{cases}$$

$$\begin{cases} DR0_{INV2} = 0 \\ DR_{INV2} = 0 \end{cases}$$

Expressing a q-axis and a d-axis current in the rotating coordinate system of the motor at k+2 instance as:

$$\begin{cases} i_d(k+2) = i_d(k+1) + \frac{Ts}{L_s} \times (u_d^{INV1}(k+1) - R_s \times i_d(k+1) - EMF_d(k+1)) \\ i_q(k+2) = i_q(k+1) + \frac{Ts}{L_s} \times (u_d^{INV1}(k+1) - R_s \times i_q(k+1) - EMF_q(k+1)) \end{cases}$$

If a $\Delta i_d^{INV1}$ and a $\Delta i_q^{INV1}$ are less than the incremental required $\Delta i_d^*$, and $\Delta i_q^*$ at the current moment, the required voltage vector is beyond the output capacity of the inverter 1. Furthermore, inverter 2 is required to output the remaining increments to meet the motor operating conditions. In this situation, inverter 1 outputs the maximum increments of $\Delta i_d^{INV1}$ and $\Delta i_q^{INV1}$, inverter 2 acts on multiple voltage vectors in the current period. Express the voltage vector in the rotating coordinate system generated in the current sampling period as:

$$\begin{cases} u_\alpha^{INV1} = \text{real}(VV_i^{INV1}) \\ u_\beta^{INV1} = \text{imag}(VV_i^{INV1}) \end{cases}$$

$$\begin{cases} u_\alpha^{INV2} = DR0_{INV2} \times (DR_{INV2} \times \text{real}(VV_i^{INV2}) + \\ \qquad (1 - DR_{INV2}) \times \text{real}(VV_j^{INV2})) \\ u_\beta^{INV2} = DR0_{INV2} \times (DR_{INV2} \times \text{imag}(VV_i^{INV2}) + \\ \qquad (1 - DR_{INV2}) \times \text{imag}(VV_j^{INV2})) \end{cases}$$

wherein, u α, u β, u α, and u β are the voltage vector in the stationary coordinate system selected by inverter 1 and inverter 2, respectively, distinguishing by superscripts; real($VV_i^{INV1}$) and imag($VV_i^{INV1}$) are the real and imaginary parts of the first virtual voltage vector to be selected by inverter 1 at this moment; real($VV_i^{INV2}$) and imag($VV_i^{INV2}$) are the real and imaginary parts of the first candidate voltage vector of inverter 2; real($VV_j^{INV2}$) and imag($VV_j^{INV2}$) are the real and imaginary parts of the second candidate voltage vector of inverter 2 respectively; $DR0_{INV2}$ is the scale factor for the sum of the effective voltage vectors action; $DR_{INV2}$ is the scale factor between the two effective voltage vector;

Expressing the scale factors of inverter 1 and inverter 2 when the increment provided by inverter 1 less than needs as:

$$\begin{cases} DR0_{INV1} = 1 \\ DR_{INV1} = 1 \end{cases}$$

$$\begin{cases} DR0_{INV2} = m(0 \le m \le 1) \\ DR_{INV2} = n(0 \le n \le 1) \end{cases}$$

Expressing the q-axis and d-axis current in the rotating coordinate system of the motor at k+2 instance as:

$$\begin{cases} i_d(k+2) = i_d(k+1) + \frac{Ts}{L_s} \times (u_d^{INV1}(k+1) - R_s \times i_d(k+1) - \\ \qquad EMF_d(k+1)) - \frac{Ts}{L_s} \times u_d^{INV2}(k+1) \\ i_q(k+2) = i_q(k+1) + \frac{Ts}{L_s} \times (u_d^{INV1}(k+1) - R_s \times i_q(k+1) - \\ \qquad EMF_q(k+1)) - \frac{Ts}{L_s} \times u_d^{INV2}(k+1) \end{cases}$$

Step 4.4) According to the two different working conditions in Step 4.3), substituting the q-axis and d-axis current in the rotating coordinate system of the motor at k+2 instance into the cost function to obtain the expected voltage vector:

$$\lambda(i,j) = (i_d^* - i_d(k+2))^2 + (i_q^* - i_q(k+2))^2.$$

Further, the specific steps of Step 5) include:

Step 5.1) According to Step 4), the index number i of the optimal voltage vector has been found. The scale factor $DR0_{INV1}$ and $DR_{INV1}$ for inverter 1, and the scale factor $DR0_{INV2}$ and $DR_{INV2}$ for inverter 2. Outputting the duty cycle of each phase of the open-winding inverter by the virtual voltage vector table of the open winding five-phase permanent magnet synchronous motor, the details are proposed in Step 2;

If the $\Delta i_d^{INV1}$ and the $\Delta i_q^{INV1}$ are greater than the required increment $\Delta i_d^*$ and $\Delta i_q^*$ at the current moment, express the equation as:

$$\text{DutyRatio}_x^{INV1} = DR0_{INV1} \times (DR_{INV1} \times s_x^{INV1}(i) + (1 - DR_{INV1}) \times s_x^{INV1}(j))$$

$$\text{DutyRatio}_x^{INV2} = 0$$

wherein $\text{DutyRatio}_x^{INV1}$ is the value calculated by the proposed algorithm, used for inverter 1 to generate the corresponding duty cycle waveform; $\text{DutyRatio}_x^{INV2}$ is used for inverter 2 to generate the corresponding duty cycle waveform; $s_x^{INV1}(i)$ is the first selected by inverter 1, is the switching function of a virtual voltage vector, wherein x=a,b,c,d,e; $s_x^{INV1}(j)$ is the switching function of the second virtual voltage vector selected by inverter 1, wherein x-a,b,c,d,e;

If the $\Delta i_d^{INV1}$ and the $\Delta i_q^{INV1}$ are less than the required increments $\Delta i_d^*$ and $\Delta i_q^*$ at this moment, express the equation as:

$$\text{DutyRatio}_x^{INV1} = s_x^{INV1}(i)$$

$$\text{DutyRatio}_x^{INV2} = DR0_{INV2} \times (DR_{INV2} \times s_x^{INV2}(i) + (1 - DR_{INV2}) \times s_x^{INV2}(j))$$

wherein DutyRatio$_x^{INV1}$ is the value calculated by the proposed algorithm for inverter 1 to generate the corresponding duty cycle waveform; DutyRatio$_x^{INV2}$ is used for inverter 2 to generate the corresponding duty cycle waveform; $s_x^{INV1}(i)$ is the first selected by inverter 1, is the switching function of a virtual voltage vector, wherein x=a,b,c,d,e; $s_x^{INV1}(i)$ is the first selected by inverter 1, is the switching function of a virtual voltage vector, wherein x=a,b,c,d,e; $s_x^{INV2}(j)$ is the switching function of the second virtual voltage vector selected by inverter 2, wherein x=a, b,c,d,e;

Step 5.2) Generating the pulse width modulation signal to the diver chip of the inverter by the obtained duty cycle of inverter 1 and the duty cycle of inverter 2 in Step 5.1). Finally, the corresponding voltage is output to the motor through the power semiconductor.

The device of a model predictive decomposition control for an open-winding five-phase permanent magnet synchronous motor mainly includes:

The data acquisition unit. Using a Hall-type current sensor ACS758 to sample the phase current of the motor; Using the relative position type encoder to obtain a electrical angle and a speed of the motor. Using the enhanced capture unit in the digital signal processor to calculate the electrical angular velocity ω and the electrical angle θ of the open-winding five-phase permanent magnet synchronous motor. Using the analog to digital converter module in the digital signal processor to sampling and transforming to obtain the current $i_d$ and $i_q$ of the q-axis and d-axis in the rotating coordinate system.

Command voltage input unit. Using a TMS320F28377S as the digital signal processor produced by Texas Instruments. Obtaining the reference values iq* and id* of the q-axis and d-axis currents in the rotating coordinate system by calculation through the program in the digital signal processor after the motor speed is given;

The increment judging unit. Judging whether the current voltage vector provided by the inverter 1 can meet the current demand of the motor drive system;

Inverter 1 acts solely unit. If the $\Delta_d^{INV1}$ and the $\Delta_q^{INV1}$ are greater than the current reference value through the internal program of the digital signal processor, inverter 1 output the duty cycle of DutyRatio$_x^{INV1}$ solely, and inverter 2 output the duty cycle of 0;

Inverter 1 and inverter 2 work together unit. If the $\Delta i_d^{INV1}$ and the $\Delta i_q^{INV1}$ are less than the current reference value through the internal program of the digital signal processor, inverter 1 output the duty cycle of DutyRatio$_x^{INV1}$ solely, and inverter 2 output the duty cycle of DutyRatio;

Pulse width modulation output unit. Using a voltage source inverter, modulating the duty cycle of inverter 1 and inverter 2 through a triangular carrier. Using a isolated 1ED020F12 driver chip to drives the power semiconductor to generate the corresponding phase voltage;

In conclusion, the data acquisition unit processes the sampled data through the digital signal processor as input of the system. According to the instructions input by the instruction voltage input unit, the digital signal processor controls and calculates the given value at this moment using the data acquired by the data acquisition unit. By judging the given value at the current moment selecting the mode suitable for the current state to output, the increment judgment unit judges between the inverter 1 acts solely unit and inverter 1 and inverter 2 work together unit. The pulse width modulation output unit transmits the duty cycle calculated by the above functions. The output acts on the motor winding to generate current. Then those current have been collected and calculated through the data acquisition unit, forming a complete hardware and software closed-loop control system.

The beneficial effects of the present invention:

1) The present invention is based on a five-phase permanent magnet synchronous motor model predictive control method. The advantages of this present invention is good dynamic performance, simple structure, and easy implementation.

2) By decomposing the open-winding five-phase permanent magnet synchronous motor system into the superposition of two independent inverters, the flexibility of the open-winding topology system can be improved.

3) The use of the dual inverter decomposition control method effectively reduce the switching times of the inverter, thereby reducing the overall switching loss of the five-phase open-winding permanent magnet synchronous motor system.

4) The proposed open-winding decomposition control method is universal and easy to implement, conducive to the engineering and practical application of the new theory.

BRIEF DESCRIPTION OF THE DRAWINGS

FIG. 3A is the voltage vector distribution of the fundamental subspace; FIG. 3B is the voltage vector distribution of the third harmonic subspace.

FIG. 17A shows Phase A duty cycle when inverter 1 acts alone; FIG. 17B shows Phase A duty cycle when inverter 2 acts on alone.

FIG. 18A shows Phase A duty cycle when inverter 1 acts alone; FIG. 18B shows Phase A duty cycle when inverter 2 acts on alone.

FIG. 19A shows Phase A duty cycle when inverter 1 acts alone; FIG. 19B shows Phase A duty cycle when inverter 2 acts on alone.

DETAILED DESCRIPTION OF THE EMBODIMENTS

To make the objectives, technical solutions, and advantages of the present invention clearer, the following further describes the present invention in detail concerning the accompanying drawings and embodiments. The specific embodiments described here are only used to explain the present invention but not used to limit the present invention.

Figure 1:
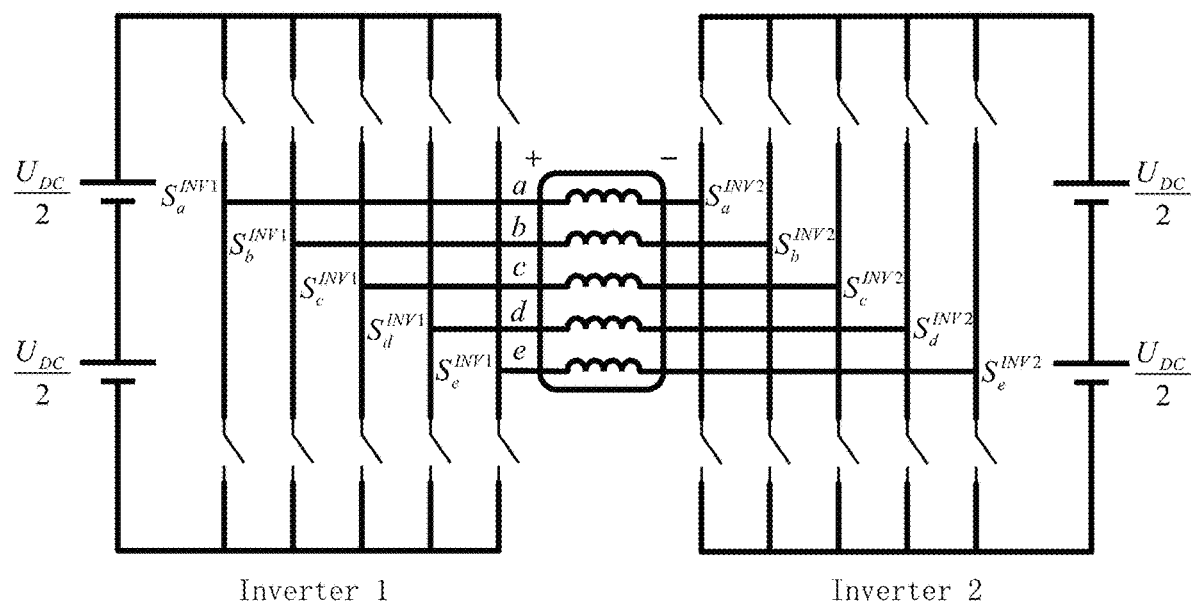
FIG. 1 Open winding topology and peripheral device circuit.
Figure 2:
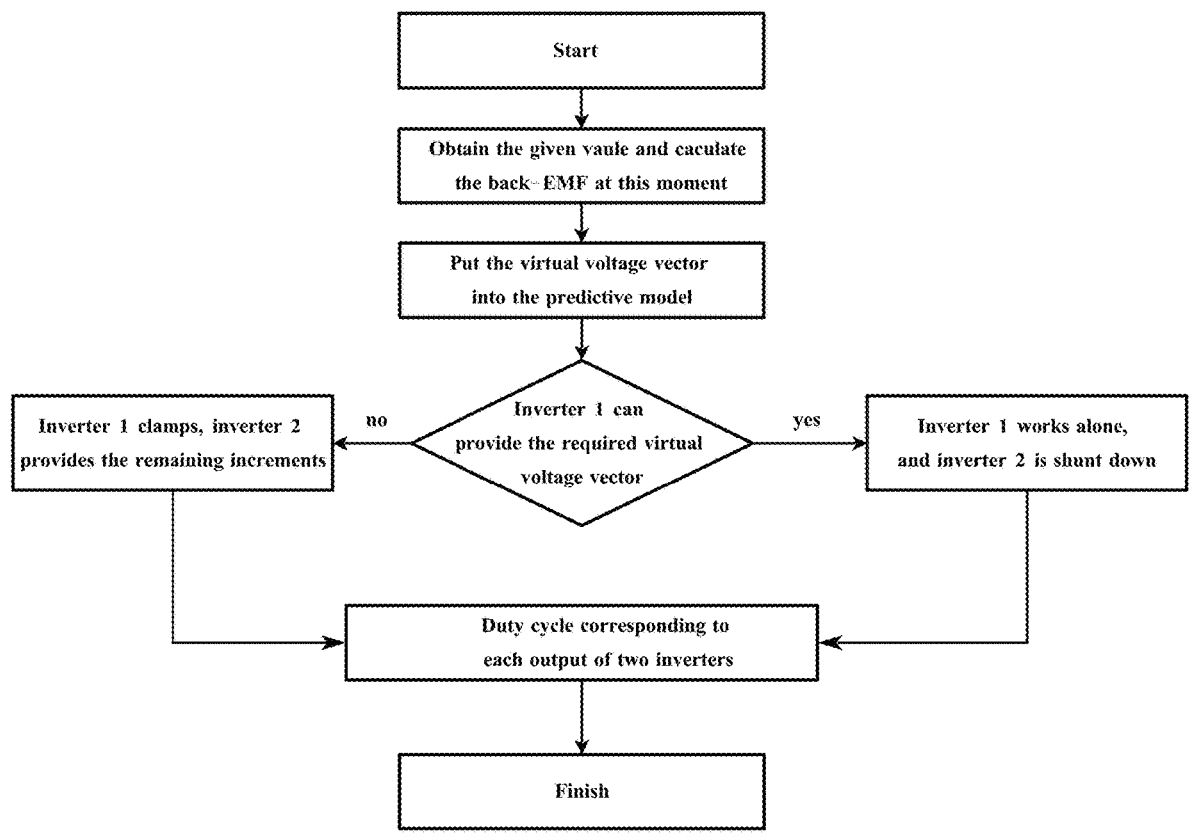
FIG. 2 The internal implementation process of the device.

As shown in FIG. 1 and FIG. 2, the present invention proposes a model predictive decomposition control method and device for an open-winding five-phase permanent magnet synchronous motor. The proposed method regards the two inverters of the open-winding topology system as two independent units, takes the voltage vector provided by inverter 1 as the starting point, and select different inverter switches sequence for the needs of the open-winding system under different working conditions. The present invention can effectively reduce the switching times of the open-winding five-phase permanent magnet synchronous motor control system and reduce the switching loss of the inverter under the premise of ensuring performance.

Among them, the adopted dual-power open-winding topology and the peripheral circuit of the device are shown in FIG. 1. FIG. 2 is the flowchart of the proposed model predictive decomposition control device.

The specific implementation steps of the proposed model predictive decomposition control method for open-winding five-phase permanent magnet synchronous motors include:

Step 1) Obtaining the q-axis and d-axis currents in the fundamental space of the open-winding five-phase permanent magnet synchronous motor in the rotating coordinate system as the given of the control system.

Step 1.1) Calculating the speed error between the given speed n* and the actual speed n of the motor in real-time. The required q-axis current reference value $i_q^*$ has been obtained through the PI regulator. The d-axis current reference value is set as $i_d^*=0$.

Step 1.2) Sampling the five-phase currents, from the five-phase natural coordinate system ABCDE to the two-phase rotating coordinate system. Obtaining the currents $i_d$ and $i_q$ of the q-axis and d-axis through the coordinate transformation from the five-phase stationary coordinate system to the two-phase rotating coordinate system.

Expressing the transformation matrix from the five-phase natural coordinate system ABCDE to the two-phase rotating coordinate system as:

$$T_{5s/2r} = \frac{2}{5}\begin{bmatrix} \cos\theta_e & \cos(\theta_e-\alpha) & \cos(\theta_e-2\alpha) & \cos(\theta_e-3\alpha) & \cos(\theta_e-4\alpha) \\ -\sin\theta_e & -\sin(\theta_e-\alpha) & -\sin(\theta_e-2\alpha) & -\sin(\theta_e-3\alpha) & -\sin(\theta_e-4\alpha) \\ \cos 3\theta_e & \cos 3(\theta_e-\alpha) & \cos 3(\theta_e-2\alpha) & \cos 3(\theta_e-3\alpha) & \cos 3(\theta_e-4\alpha) \\ -\sin 3\theta_e & -\sin 3(\theta_e-\alpha) & -\sin 3(\theta_e-2\alpha) & -\sin 3(\theta_e-3\alpha) & -\sin 3(\theta_e-4\alpha) \\ \frac{1}{2} & \frac{1}{2} & \frac{1}{2} & \frac{1}{2} & \frac{1}{2} \end{bmatrix}$$

wherein, $\alpha=0.4\pi$, $\theta_e$ is the electrical angle of the motor.

Step 1.3) Obtaining the voltage components $i_\alpha$ and $i_\beta$ in the stationary coordinate system through the q-axis, and d-axis voltage undergoes the coordinate transformation from the two-phase rotating coordinate system to the two-phase stationary coordinate system.

Expressing the transformation matrix from the two-phase rotating coordinate system to the two-phase stationary coordinate system as:

$$T_{2r/2s} = \begin{bmatrix} \cos\theta_e & -\sin\theta_e & 0 & 0 & 0 \\ \sin\theta_e & \cos\theta_e & 0 & 0 & 0 \\ 0 & 0 & \cos 3\theta_e & -\sin 3\theta_e & 0 \\ 0 & 0 & \sin 3\theta_e & \cos 3\theta_e & 0 \\ 0 & 0 & 0 & 0 & 1 \end{bmatrix}$$

Step 2) Constructing the virtual voltage vector table of the open-winding five-phase permanent magnet synchronous motor in the static coordinate system. Applying the label of the virtual voltage vector in the previous control cycle, and calculating the voltage in the static coordinate system. Moreover, solving the back electromotive force of the motor according to the mathematical model of the motor;

Step 2.1) Constructing an open-winding five-phase permanent magnet synchronous motor virtual voltage vector table:

Expressing the voltage vector generated by the five-phase voltage source inverter in the stationary coordinate system as:

$$u_s = \frac{2}{5} \times (s_a + s_b w + s_c w^2 + s_d w^3 + s_e w^4) \times U_{dc}$$

$$\left(w = e^{j\frac{2}{5}\pi}\right)$$

wherein, $U_{dc}$ is the DC bus voltage; $u_s$ is the voltage vector value in the static coordinate system; $s_i$ (i=a,b,c,d,e) is the switching function of each bridge arm; when the upper bridge arm is turned on, $s_i=1$, the lower bridge arm is turned on $s_i=0$.

Figure 3A:
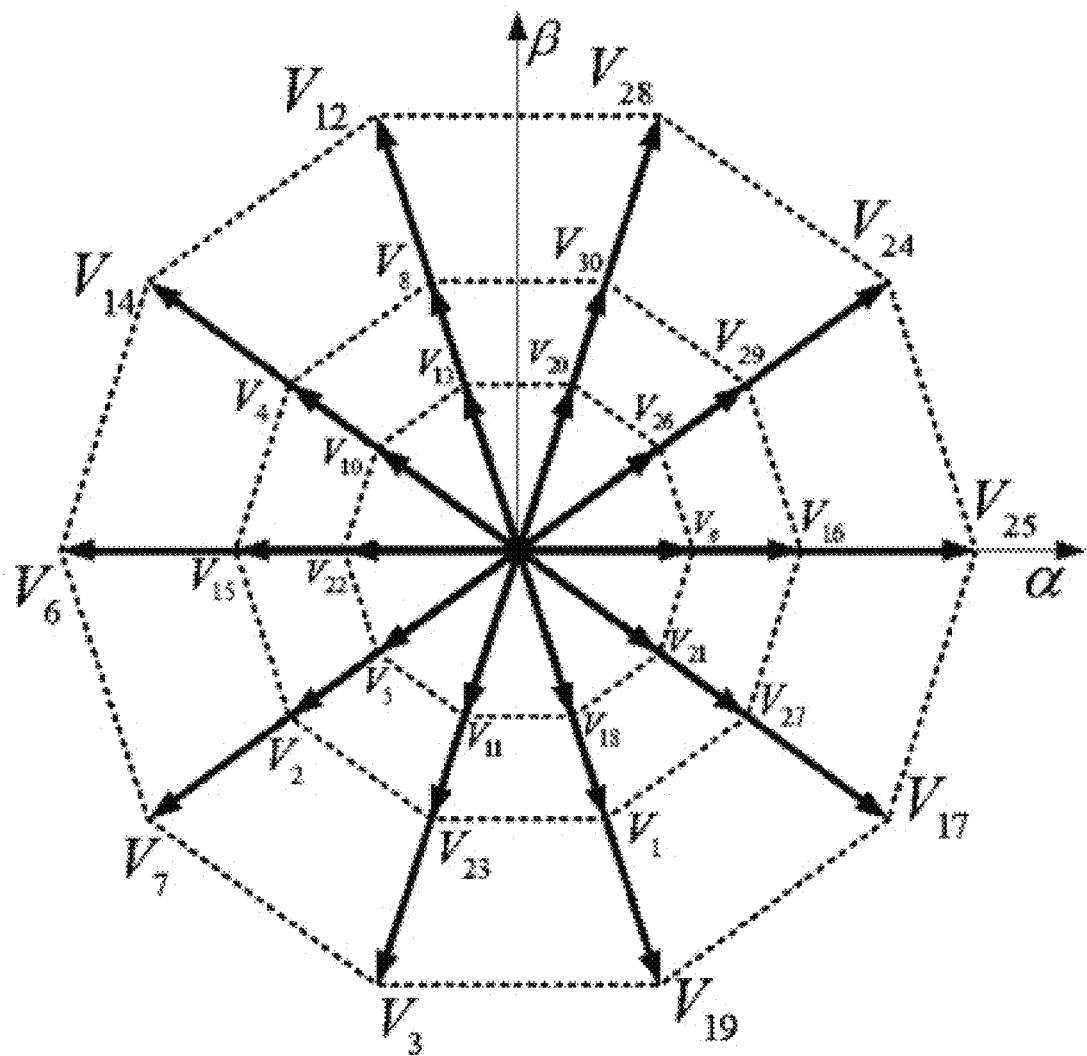
FIGS. 3A-3B The distribution of the space voltage vector generated by a single inverter; where
Figure 3B:
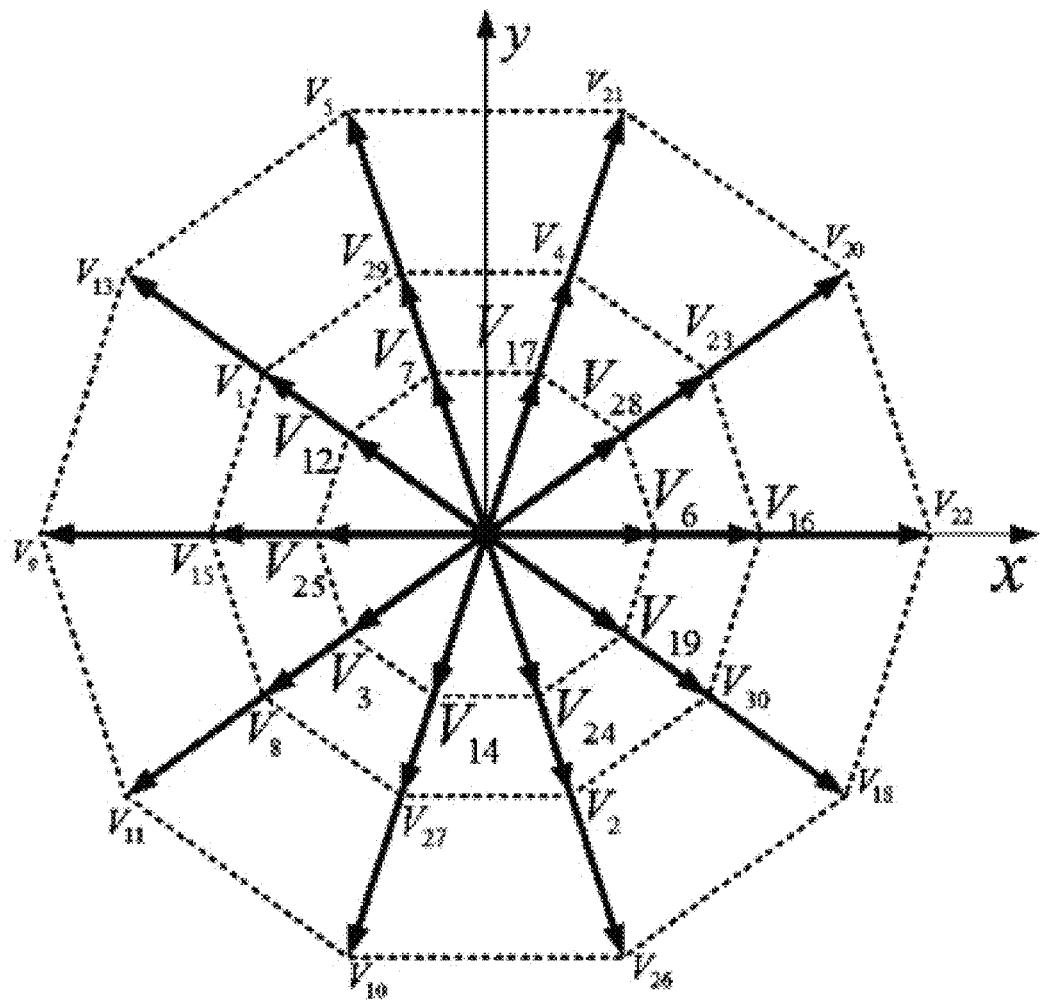

The space voltage vector distribution diagram of a single inverter in the five-phase open winding system is shown in FIGS. 3A-3B:

The space voltage vector distribution table of a single inverter is shown in Table 1:

TABLE 1

| The space voltage vector distribution diagram of a single inverter | | |
|---|---|---|
| Voltage vector | Length of vector | Label of vector |
| Big vector ($u_B$) | 0.6472 $U_{dc}$ | $V_{24}V_{25}V_{28}V_{12}V_{14}V_6V_7V_3V_{19}V_{17}$ |
| Meduim vector ($u_M$) | 0.4 $U_{dc}$ | $V_{16}V_{29}V_8V_{30}V_4V_{15}V_2V_{23}V_1V_{27}$ |

TABLE 1-continued

The space voltage vector distribution diagram of a single inverter

| Voltage vector | Length of vector | Label of vector |
|---|---|---|
| Little vector ($u_L$) | 0.2472 $U_{dc}$ | $V_9 V_{26} V_{20} V_{13} V_{10} V_{22} V_5 V_{11} V_{18} V_{21}$ |
| Zero vector ($u_0$) | 0 | $V_0 V_{31}$ |

Step 2.2) According to the principle that the third harmonic space voltage is equivalent to zero, synthesizing the voltage vector in the fundamental wave sub-plane. The synthesis principle is as follows:

$$VV_i(u_B, u_L) = 0.618 \times u_M + (1 - 0.618) \times u_B$$

wherein, the scale factor of 0.618 can make the two voltage vectors equivalent to zero in the harmonic subspace of the five-phase permanent magnet synchronous motor.

Figure 4:
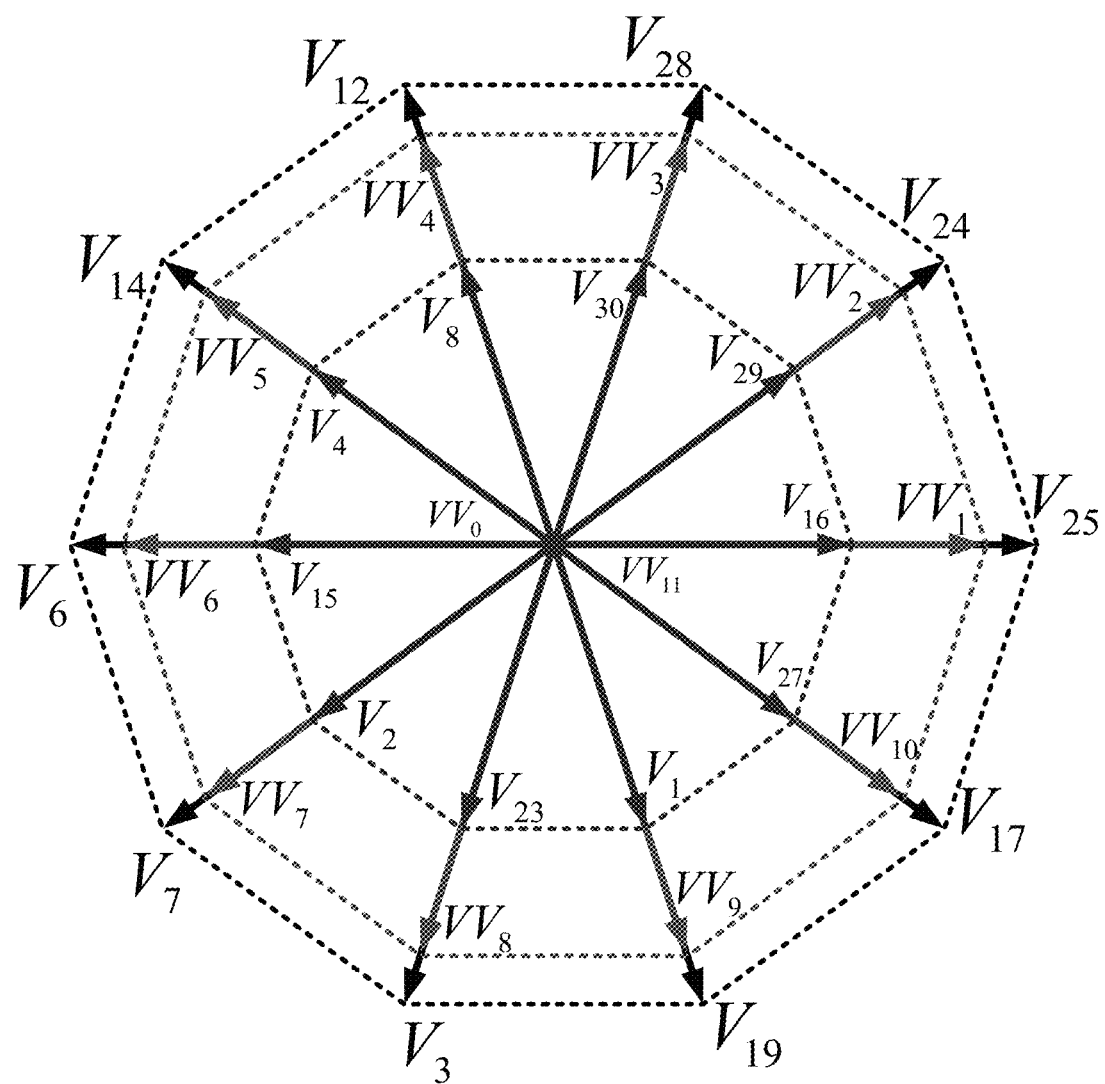
FIG. 4 Single inverter virtual voltage vector synthesis.
Figure 5:
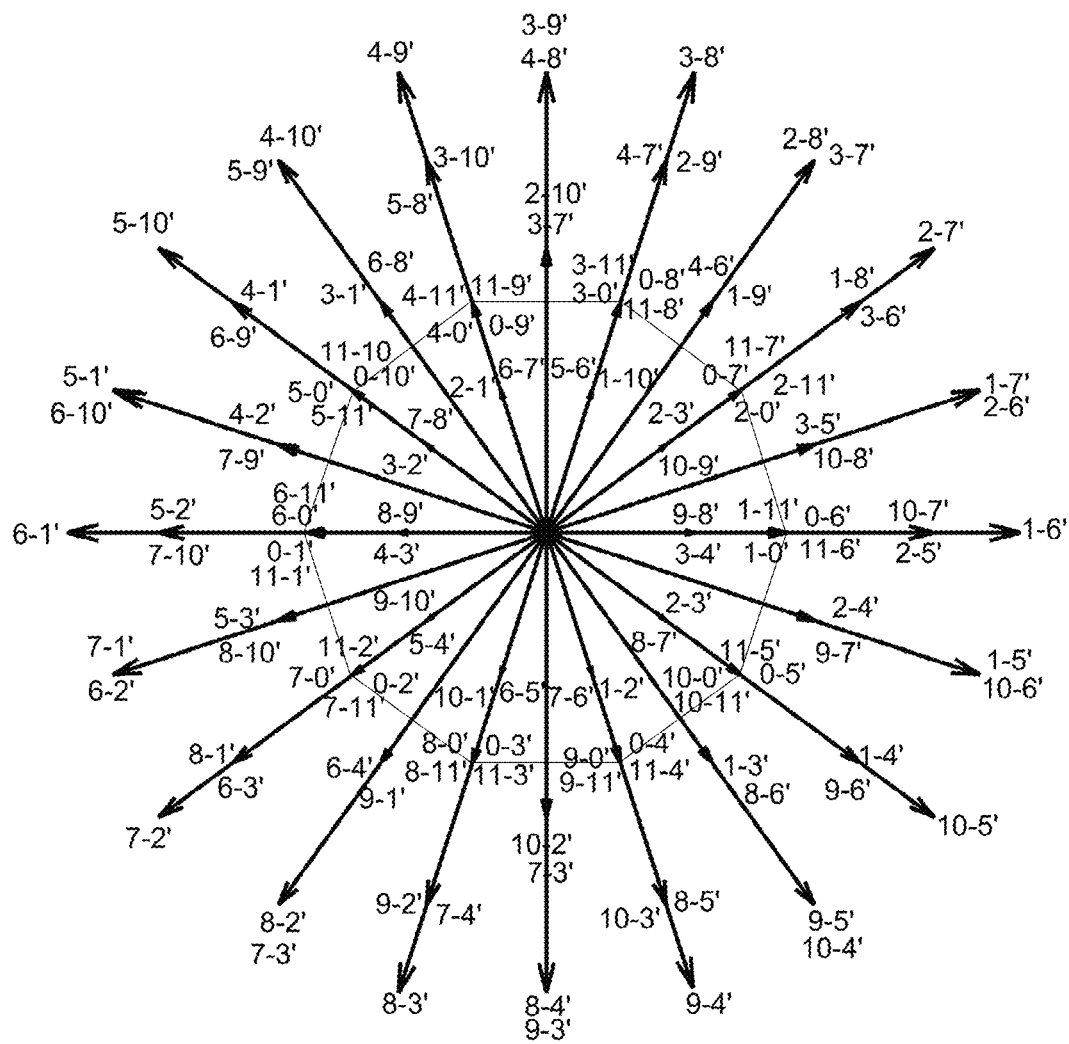
FIG. 5 Virtual space voltage vector distribution of open-winding five-phase permanent magnet synchronous motor.

The synthesized virtual voltage vector is shown in FIG. 4:

According to the principle of the open-winding topology, the space voltage vector distribution of the open-winding five-phase permanent magnet synchronous motor is shown in FIG. 5. The voltage vector in the figure is the subtraction of the virtual voltage vector provided by inverter 1 and inverter 2. For example, 3-9' means the virtual voltage vector in the open-winding topology obtained by subtracting the virtual voltage vector No. 3 of inverter 1 and the virtual voltage vector No. 9 of the inverter 2.

All the virtual space voltage vector distribution of the open-winding five-phase permanent magnet synchronous motor is shown in Table 2:

TABLE 2 virtual space voltage vector distribution of the open-winding five-phase PMSM

| Label | Label of virtual voltage vector in inverter 1 | Label of virtual voltage vector in inverter 2 | Voltage vector in inverter 1 Big vector | Voltage vector in inverter 1 Medium vector | Voltage vector in inverter 2 Big vector | Voltage vector in inverter 2 Medium vector |
|---|---|---|---|---|---|---|
| 1 | 0 | 0 | 0 | 0 | 0 | 0 |
| 2 | 0 | 1 | 0 | 0 | 25 | 16 |
| 3 | 0 | 2 | 0 | 0 | 24 | 29 |
| 4 | 0 | 3 | 0 | 0 | 28 | 8 |
| 5 | 0 | 4 | 0 | 0 | 12 | 30 |
| 6 | 0 | 5 | 0 | 0 | 14 | 4 |
| 7 | 0 | 6 | 0 | 0 | 6 | 15 |
| 8 | 0 | 7 | 0 | 0 | 7 | 9 |
| 9 | 0 | 8 | 0 | 0 | 3 | 23 |
| 10 | 0 | 9 | 0 | 0 | 19 | 1 |
| 11 | 0 | 10 | 0 | 0 | 17 | 27 |
| 12 | 0 | 11 | 0 | 0 | 31 | 31 |
| 13 | 1 | 0 | 25 | 16 | 0 | 0 |
| 14 | 1 | 1 | 25 | 16 | 25 | 16 |
| 15 | 1 | 2 | 25 | 16 | 24 | 29 |
| 16 | 1 | 3 | 25 | 16 | 28 | 8 |
| 17 | 1 | 4 | 25 | 16 | 12 | 30 |
| 18 | 1 | 5 | 25 | 16 | 14 | 4 |
| 19 | 1 | 6 | 25 | 16 | 6 | 15 |
| 20 | 1 | 7 | 25 | 16 | 7 | 2 |
| 21 | 1 | 8 | 25 | 16 | 3 | 23 |
| 20 | 1 | 9 | 25 | 16 | 19 | 1 |
| 23 | 1 | 10 | 25 | 16 | 17 | 27 |
| 24 | 1 | 11 | 25 | 16 | 31 | 31 |
| 25 | 2 | 0 | 24 | 29 | 0 | 0 |
| 26 | 2 | 1 | 24 | 29 | 25 | 16 |
| 27 | 2 | 2 | 24 | 29 | 24 | 29 |
| 28 | 2 | 3 | 24 | 29 | 28 | 8 |
| 29 | 2 | 4 | 24 | 29 | 12 | 30 |
| 30 | 2 | 5 | 24 | 29 | 14 | 4 |
| 31 | 2 | 6 | 24 | 29 | 6 | 15 |
| 32 | 2 | 7 | 24 | 29 | 7 | 2 |
| 33 | 2 | 8 | 24 | 29 | 3 | 23 |
| 34 | 2 | 9 | 24 | 29 | 19 | 1 |
| 35 | 2 | 10 | 24 | 29 | 17 | 27 |
| 36 | 2 | 11 | 24 | 29 | 31 | 31 |
| 37 | 2 | 0 | 28 | 8 | 0 | 0 |
| 38 | 2 | 1 | 28 | 8 | 25 | 16 |
| 39 | 2 | 2 | 28 | 8 | 24 | 29 |
| 40 | 3 | 3 | 28 | 8 | 28 | 8 |
| 41 | 3 | 4 | 28 | 8 | 12 | 30 |
| 42 | 3 | 5 | 28 | 8 | 14 | 4 |
| 43 | 3 | 6 | 28 | 8 | 6 | 15 |
| 44 | 3 | 7 | 28 | 8 | 7 | 9 |
| 45 | 3 | 8 | 28 | 8 | 3 | 23 |
| 46 | 3 | 9 | 28 | 8 | 19 | 1 |
| 47 | 3 | 10 | 28 | 8 | 17 | 27 |
| 48 | 3 | 11 | 28 | 8 | 31 | 31 |
| 49 | 4 | 0 | 12 | 30 | 0 | 0 |
| 50 | 4 | 1 | 12 | 30 | 25 | 16 |
| 51 | 4 | 2 | 12 | 30 | 24 | 29 |
| 52 | 4 | 3 | 12 | 30 | 28 | 8 |
| 53 | 4 | 4 | 12 | 30 | 12 | 30 |
| 54 | 4 | 5 | 12 | 30 | 14 | 4 |
| 55 | 4 | 6 | 12 | 30 | 6 | 15 |
| 56 | 4 | 7 | 12 | 30 | 7 | 2 |
| 57 | 4 | 8 | 12 | 30 | 3 | 23 |
| 58 | 4 | 9 | 12 | 30 | 19 | 1 |
| 59 | 4 | 10 | 12 | 30 | 17 | 27 |
| 60 | 4 | 11 | 12 | 30 | 31 | 31 |
| 61 | 5 | 0 | 14 | 4 | 0 | 0 |
| 62 | 5 | 1 | 14 | 4 | 25 | 16 |
| 63 | 5 | 2 | 14 | 4 | 24 | 29 |
| 64 | 5 | 3 | 14 | 4 | 28 | 8 |
| 65 | 5 | 4 | 14 | 4 | 12 | 30 |
| 66 | 5 | 5 | 14 | 4 | 14 | 4 |
| 67 | 5 | 6 | 14 | 4 | 6 | 15 |
| 68 | 5 | 7 | 14 | 4 | 7 | 2 |
| 69 | 5 | 8 | 14 | 4 | 3 | 23 |
| 70 | 5 | 9 | 14 | 4 | 19 | 1 |
| 71 | 5 | 10 | 14 | 4 | 17 | 27 |
| 72 | 5 | 11 | 14 | 4 | 31 | 31 |
| 73 | 6 | 0 | 6 | 15 | 0 | 0 |
| 74 | 6 | 1 | 6 | 15 | 25 | 16 |
| 75 | 6 | 2 | 6 | 15 | 24 | 29 |
| 76 | 6 | 3 | 6 | 15 | 28 | 8 |
| 77 | 6 | 4 | 6 | 15 | 12 | 30 |
| 78 | 6 | 5 | 6 | 15 | 14 | 4 |
| 79 | 6 | 6 | 6 | 15 | 6 | 15 |
| 80 | 6 | 7 | 6 | 15 | 7 | 9 |
| 81 | 6 | 8 | 6 | 15 | 3 | 23 |
| 82 | 6 | 9 | 6 | 15 | 19 | 1 |
| 83 | 6 | 10 | 6 | 15 | 17 | 27 |
| 84 | 6 | 11 | 6 | 15 | 31 | 31 |
| 85 | 7 | 0 | 7 | 2 | 0 | 0 |
| 86 | 7 | 1 | 7 | 2 | 25 | 16 |
| 87 | 7 | 2 | 7 | 2 | 24 | 29 |
| 88 | 7 | 3 | 7 | 2 | 28 | 8 |
| 89 | 7 | 4 | 7 | 2 | 12 | 30 |
| 90 | 7 | 5 | 7 | 2 | 14 | 4 |
| 91 | 7 | 6 | 7 | 2 | 6 | 15 |
| 92 | 7 | 7 | 7 | 2 | 7 | 2 |
| 93 | 7 | 8 | 7 | 2 | 3 | 23 |
| 94 | 7 | 9 | 7 | 2 | 19 | 1 |
| 95 | 7 | 10 | 7 | 2 | 17 | 27 |
| 96 | 7 | 11 | 7 | 2 | 31 | 31 |
| 97 | 8 | 0 | 2 | 23 | 0 | 0 |
| 98 | 8 | 1 | 3 | 23 | 25 | 16 |
| 99 | 8 | 2 | 3 | 23 | 24 | 29 |
| 100 | 8 | 3 | 3 | 23 | 28 | 8 |
| 101 | 8 | 4 | 3 | 23 | 12 | 30 |

TABLE 2-continued virtual space voltage vector distribution of the open-winding five-phase PMSM

| Label | Label of virtual voltage vector in inverter 1 | Label of virtual voltage vector in inverter 2 | Voltage vector in inverter 1 Big vector | Voltage vector in inverter 1 Meduim vector | Voltage vector in inverter 2 Big vector | Voltage vector in inverter 2 Meduim vector |
|---|---|---|---|---|---|---|
| 102 | 8 | 5 | 3 | 23 | 14 | 4 |
| 103 | 8 | 6 | 3 | 23 | 6 | 15 |
| 104 | 8 | 7 | 3 | 23 | 7 | 9 |
| 105 | 8 | 8 | 3 | 23 | 3 | 23 |
| 106 | 8 | 9 | 3 | 23 | 19 | 1 |
| 107 | 8 | 10 | 3 | 23 | 17 | 27 |
| 108 | 8 | 11 | 3 | 23 | 31 | 31 |
| 109 | 9 | 0 | 19 | 1 | 0 | 0 |
| 110 | 9 | 1 | 19 | 1 | 25 | 16 |
| 111 | 9 | 2 | 19 | 1 | 24 | 29 |
| 112 | 9 | 3 | 19 | 1 | 28 | 8 |
| 113 | 9 | 4 | 19 | 1 | 12 | 30 |
| 114 | 9 | 5 | 19 | 1 | 14 | 4 |
| 115 | 9 | 6 | 19 | 1 | 6 | 15 |
| 116 | 9 | 7 | 19 | 1 | 7 | 2 |
| 117 | 9 | 8 | 19 | 1 | 3 | 23 |
| 118 | 9 | 9 | 19 | 1 | 19 | 1 |
| 119 | 9 | 10 | 19 | 1 | 17 | 27 |
| 120 | 9 | 11 | 19 | 1 | 31 | 31 |
| 121 | 10 | 0 | 17 | 27 | 0 | 0 |
| 122 | 10 | 1 | 17 | 27 | 25 | 16 |
| 123 | 10 | 2 | 17 | 27 | 24 | 29 |
| 124 | 10 | 3 | 17 | 27 | 28 | 8 |
| 125 | 10 | 4 | 17 | 27 | 12 | 30 |
| 126 | 10 | 5 | 17 | 27 | 14 | 4 |
| 127 | 10 | 6 | 17 | 27 | 6 | 15 |
| 128 | 10 | 7 | 17 | 27 | 7 | 9 |
| 129 | 10 | 8 | 17 | 27 | 3 | 23 |
| 130 | 10 | 9 | 17 | 27 | 19 | 1 |
| 131 | 10 | 10 | 17 | 27 | 17 | 27 |
| 132 | 10 | 11 | 17 | 27 | 31 | 31 |
| 133 | 11 | 0 | 31 | 31 | 0 | 0 |
| 134 | 11 | 1 | 31 | 31 | 25 | 16 |
| 135 | 11 | 2 | 31 | 31 | 24 | 29 |
| 136 | 11 | 3 | 31 | 31 | 28 | 8 |
| 137 | 11 | 4 | 31 | 31 | 12 | 30 |
| 138 | 11 | 5 | 31 | 31 | 14 | 4 |
| 139 | 11 | 6 | 31 | 31 | 6 | 15 |
| 140 | 11 | 7 | 31 | 31 | 7 | 2 |
| 141 | 11 | 8 | 31 | 31 | 3 | 23 |
| 142 | 11 | 9 | 31 | 31 | 19 | 1 |
| 143 | 11 | 10 | 31 | 31 | 17 | 27 |
| 144 | 11 | 11 | 31 | 31 | 31 | 31 |

Step 2.3) Calculating the voltage vector output value of the previous sampling period:

$$u_s(k-1) = \frac{2}{5} \times \left(s_a(k-1) + s_b(k-1)w + s_c(k-1)w^2 + s_d(k-1)w^3 + s_e(k-1)w^4\right) \times U_{dc}$$

$$\left(w = e^{j\frac{2}{5}\pi}\right)$$

Furthermore, the instantaneous value of the q-axis and d-axis back electromotive force of the open-winding five-phase permanent magnet synchronous motor in the rotating coordinate system at this time can be calculated by the $i_q^*$ and the actual speed $\omega$ of the motor:

$$\begin{cases} EMF_d = \omega \times L_s \times i_q^* \\ EMF_q = \omega \times L_s \times i_d^* + \omega \times \varphi_f \end{cases}$$

wherein, Ls is the inductance of the motor, $\varphi_f$ is the permanent magnet flux linkage of the motor, iq* is the q-axis current reference value in the rotating coordinate system, and id* is the d-axis current reference value in the rotating coordinate system.

Step 3) The Euler forward difference prediction equation has been used to find the q-axis current and d-axis current in this period;

Step 3.1) Expressing the voltage equation in the rotating coordinate system of the five-phase permanent magnet synchronous motor as:

$$\begin{cases} \dfrac{di_d}{dt} = \dfrac{1}{L_s} \times (u_d - R_s \times i_d - \omega_e \times L_s \times i_q) \\ \dfrac{di_q}{dt} = \dfrac{1}{L_s} \times (u_d - R_s \times i_d - \omega_e \times L_s \times i_d - \omega_e \times \varphi_f) \end{cases}$$

wherein, $L_s$ is the inductance of the motor, $R_s$ is the stator resistance of the motor, $u_d$ is the voltage on the d-axis, $u_q$ is the voltage on the q-axis, $i_d$ is the d-axis current, and $i_q$ is the q-axis current, $\omega_e$ is the electrical angle of the motor, $\phi_f$ is the permanent magnet flux linkage of the motor;

Step 3.2) Euler forward difference method has been used to find the currents of the q-axis and d-axis in the rotating coordinate system at time k+1:

$$\begin{cases} \dfrac{i_d(k+1) - i_d(k)}{Ts} = \dfrac{1}{L_s} \times (u_d(k) - R_s \times i_d(k) - EMF_d(k)) \\ \dfrac{i_q(k+1) - i_q(k)}{Ts} = \dfrac{1}{L_s} \times (u_q(k) - R_s \times i_q(k) - EMF_q(k)) \end{cases}$$

wherein, $u_d(k)$ is the voltage on the d-axis at time k, $u_q(k)$ is the voltage on the q-axis at time k, $i_d(k)$ is the d-axis current, and $i_q(k)$ is the q-axis current, $EMF_d(k)$ is the d-axis back EMF of the motor at time k, and $EMF_q(k)$ is the q-axis back EMF of the motor at time k.

Step 4) The voltage vector generated by inverter 1 as given in the current sampling period has been substituted into the prediction model and cost function to find the current of the q-axis current and d-axis current of the rotating coordinate system in the next period, meeting with the given by the control system. If the voltage vector provided by inverter 1 meets the requirements of the drive system, inverter 2 will be closed. Otherwise, inverter 1 will be clamped to the maximum voltage vector, and inverter 2 will provide the increment of the remaining part;

Step 4.1) According to the mathematical model of open-winding five-phase permanent magnet synchronous motor, expressing the currents of the q-axis and d-axis in the rotating coordinate system at time k+1:

$$\begin{cases} u_d(k+1) = u_d^{INV1}(k+1) - u_d^{INV2}(k+1) \\ u_q(k+1) = u_q^{INV1}(k+1) - u_q^{INV2}(k+1) \end{cases}$$

Step 4.2) Expressing the voltage vectors that inverter 1 and inverter 2 provided as:

$$\begin{cases} \Delta i_d^{INV1} = \dfrac{Ts}{L_s} \times \left(u_d^{INV1}(k+1) - R_s \times i_d(k+1) - EMF_d(k+1)\right) \\ \Delta i_q^{INV1} = \dfrac{Ts}{L_s} \times \left(u_q^{INV1}(k+1) - R_s \times i_q(k+1) - EMF_q(k+1)\right) \end{cases}$$

Figure 6:
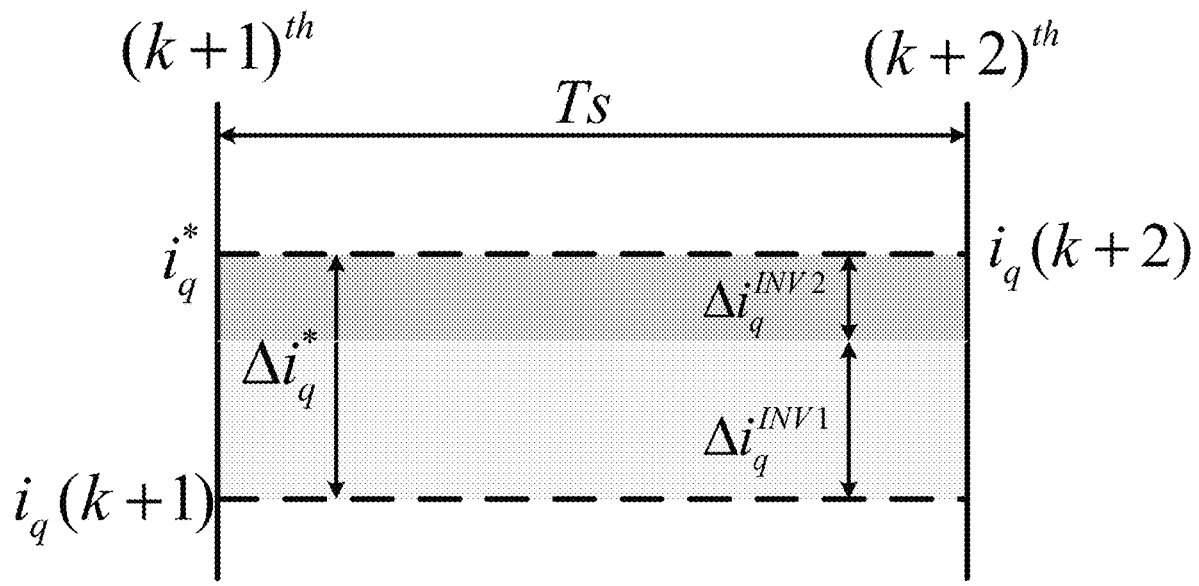
FIG. 6 decomposes the increments of inverter 1 and inverter 2 (take q-axis as an example).

-continued $$\begin{cases} \Delta i_d^{INV2} = -\dfrac{Ts}{L_s} \times u_d^{INV2}(k+1) \\ \Delta i_q^{INV2} = -\dfrac{Ts}{L_s} \times u_d^{INV2}(k+1) \end{cases}$$

wherein, $\Delta i_d^{INV1}$ and $\Delta i_q^{INV1}$ are the d-axis current and q-axis currents in the rotating coordinate system generated by the inverter 1. Rs is the phase resistance of the motor windings. Ts is the control period of the controller. Ls is the stator inductance of the motor. $EMF_d(k+1)$ is the d-axis back-EMF of the motor at the k+1 instance. $EMF_q(k+1)$ is the q-axis back-EMF of the motor at the k+1 instance;

As shown in FIG. 6, the difference between the q-axis current and the q-axis reference current at time k+1 has been calculated by using the principle of dead-beat control in the q-axis current under the rotating coordinate system:

$$\begin{cases} \Delta i_d = i_d(k+2) - i_d(k+1) = \Delta i_d^{INV1} + \Delta i_d^{INV2} \\ \Delta i_q = i_q(k+2) - i_q(k+1) = \Delta i_q^{INV1} + \Delta i_q^{INV2} \end{cases}$$

Step 4.3) Traversing the virtual voltage vector generated by inverter 1, and predict the q-axis and d-axis currents in the rotating coordinate system of the five-phase permanent magnet synchronous motor at time k+2:

If a $\Delta i_d^{INV1}$ and a $\Delta i_q^{INV1}$ is greater than or equal to the requirement $\Delta i_d^*$ and $\Delta i_q^*$ at this moment, the voltage vector provided by inverter 1 is enough, and the inverter 2 is turn off. By applying multiple voltage vectors in one cycle, express the voltage vector in the rotating coordinate system generated in the current sampling period as:

$$\begin{cases} u_\alpha^{INV1} = DR0_{INV1} \times (DR_{INV1} \times \text{real}(VV_i^{INV1}) + (1 - DR_{INV1}) \times \\ \qquad\qquad \text{real}(VV_j^{INV1})) \\ u_\beta^{INV1} = DR0_{INV1} \times (DR_{INV1} \times \text{imag}(VV_i^{INV1}) + (1 - DR_{INV1}) \times \\ \qquad\qquad \text{imag}(VV_j^{INV1})) \end{cases}$$

$$\begin{cases} u_\alpha^{INV2} = 0 \\ u_\beta^{INV2} = 0 \end{cases}$$

wherein, u α, u β, u α, and u β are the voltage vector in the stationary coordinate system selected by inverter 1 and inverter 2, respectively, distinguishing by superscripts; real $(VV_i^{INV1})$ and imag$(VV_i^{INV1})$ are the real and imaginary parts of the first virtual voltage vector to be selected by inverter 1 at this moment. real$(VV_j^{INV1})$ and imag$(VV_j^{INV1})$ are the real and imaginary parts of the second voltage vector to be selected by inverter 1. $DR0_{INV1}$ is the scale factors for the sum of the effective voltage vectors of inverter 1; $DR_{INV1}$ is the scale factor between two effective voltage vectors inverter 1;

Expressing the scale factors of inverter 1 and inverter 2 when the increment provided by inverter 1 meets the current needs as:

$$\begin{cases} DR0_{INV1} = m(0 \le m \le 1) \\ DR_{INV1} = n(0 \le n \le 1) \end{cases}$$

$$\begin{cases} DR0_{INV2} = 0 \\ DR_{INV2} = 0 \end{cases}$$

Expressing the q-axis and d-axis current in the rotating coordinate system of the motor at k+2 instance as:

$$\begin{cases} i_d(k+2) = i_d(k+1) + \dfrac{Ts}{L_s} \times (u_d^{INV1}(k+1) - R_s \times i_d(k+1) - EMF_d(k+1)) \\ i_q(k+2) = i_q(k+1) + \dfrac{Ts}{L_s} \times (u_d^{INV1}(k+1) - R_s \times i_q(k+1) - EMF_q(k+1)) \end{cases}$$

wherein $u_d^{INV1}(k+1)$ and $u_q^{INV1}(k+1)$ are the voltages of the q-axis and d-axis in the rotating coordinate system provided by the inverter 1.

Figure 7:
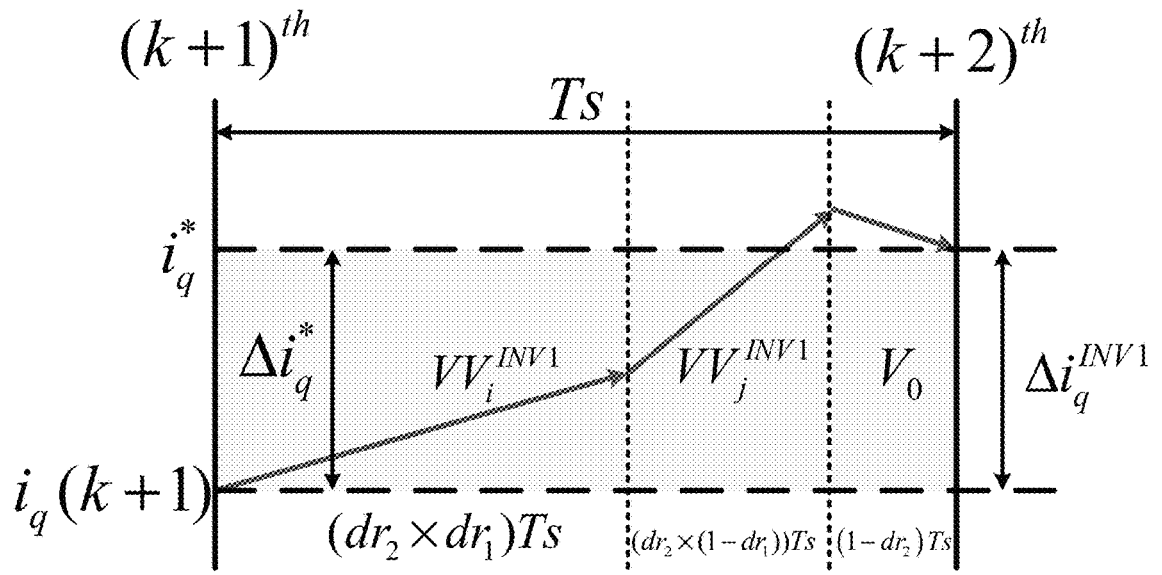
FIG. 7 Inverter 1 acts alone.

As shown in FIG. 7, the virtual voltage vector provided by the inverter has been able to meet the state of the motor at the current moment, and the inverter 2 will be shut down in time, thereby reducing the loss of the system.

If a $\Delta i_d^{INV1}$ and a $\Delta i_q^{INV1}$ are less than the incremental required $\Delta i_d^*$ and $\Delta i_q^*$ at the current moment, the required voltage vector is beyond the output capacity of the inverter 1. Furthermore, inverter 2 is required to output the remaining increments to meet the motor operating conditions. In this situation, inverter 1 outputs the maximum increments of $\Delta i_d^{INV1}$ and $\Delta i_q^{INV1}$, inverter 2 acts on multiple voltage vectors in the current period. Express the voltage vector in the rotating coordinate system generated in the current sampling period as:

$$\begin{cases} u_\alpha^{INV1} = \text{real}(VV_i^{INV1}) \\ u_\beta^{INV1} = \text{imag}(VV_i^{INV1}) \end{cases}$$

$$\begin{cases} u_\alpha^{INV2} = DR0_{INV2} \times (DR_{INV2} \times \text{real}(VV_i^{INV2}) + (1 - DR_{INV2}) \times \\ \qquad\qquad \text{real}(VV_j^{INV2})) \\ u_\beta^{INV2} = DR0_{INV2} \times (DR_{INV2} \times \text{imag}(VV_i^{INV2}) + (1 - DR_{INV2}) \times \\ \qquad\qquad \text{imag}(VV_j^{INV2})) \end{cases}$$

wherein, u α, u β, u α, and u β are the voltage vector in the stationary coordinate system selected by inverter 1 and inverter 2, respectively, distinguishing by superscripts; real $(VV_i^{INV1})$ and imag$(VV_i^{INV1})$ are the real and imaginary parts of the first virtual voltage vector to be selected by inverter 1 at this moment; real$(VV_i^{INV2})$ and imag$(VV_i^{INV2})$ are the real and imaginary parts of the first candidate voltage vector of inverter 2; real$(VV_j^{INV2})$ and imag$(VV_j^{INV2})$ are the real and imaginary parts of the second candidate voltage vector of inverter 2 respectively; $DR0_{INV2}$ is the scale factor for the sum of the effective voltage vectors action; $DR_{INV2}$ is the scale factor between the two effective voltage vector;

Expressing the scale factors of inverter 1 and inverter 2 when the increment provided by inverter 1 less than needs as:

$$\begin{cases} DR0_{INV1} = 1 \\ DR_{INV1} = 1 \end{cases}$$

$$\begin{cases} DR0_{INV2} = m(0 \le m \le 1) \\ DR_{INV2} = n(0 \le n \le 1) \end{cases}$$

Expressing The currents of the q-axis and d-axis of the motor in the rotating coordinate system at time k+2 as:

$$\begin{cases} i_d(k+2) = i_d(k+1) + \frac{Ts}{L_s} \times \left(u_d^{INV1}(k+1) - R_s \times i_d(k+1) - \right. \\ \left. EMF_d(k+1)\right) - \frac{Ts}{L_s} \times u_d^{INV2}(k+1) \\ i_q(k+2) = i_q(k+1) + \frac{Ts}{L_s} \times \left(u_q^{INV1}(k+1) - R_s \times i_q(k+1) - \right. \\ \left. EMF_q(k+1)\right) - \frac{Ts}{L_s} \times u_d^{INV2}(k+1) \end{cases}$$

Figure 8:
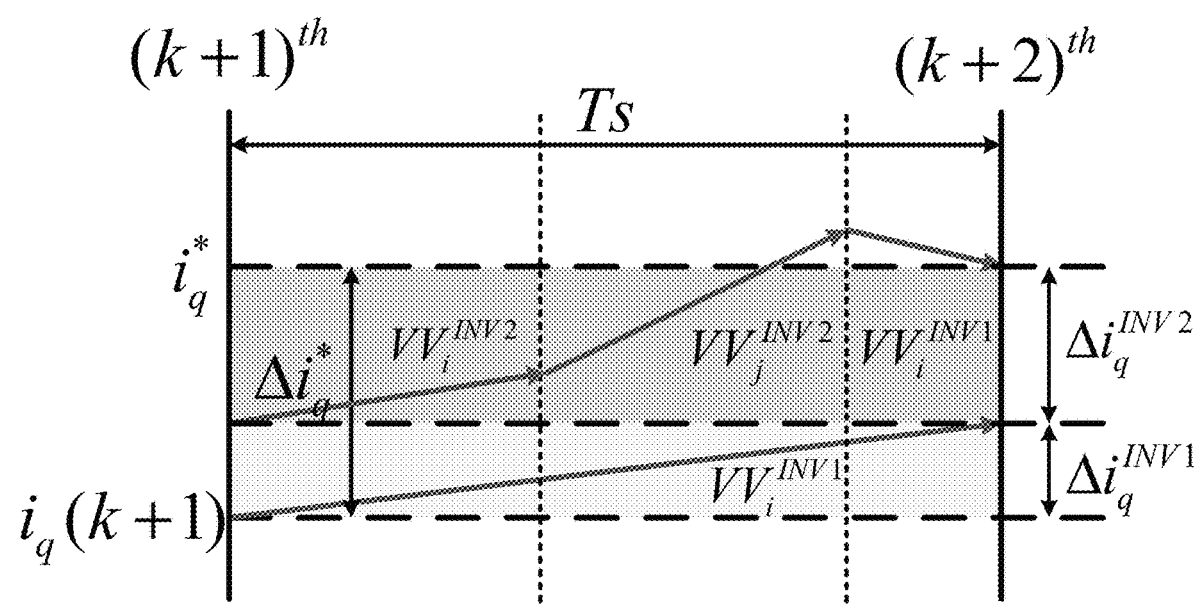
FIG. 8 Inverter 1 and inverter 2 superimposed action.
Figure 9:
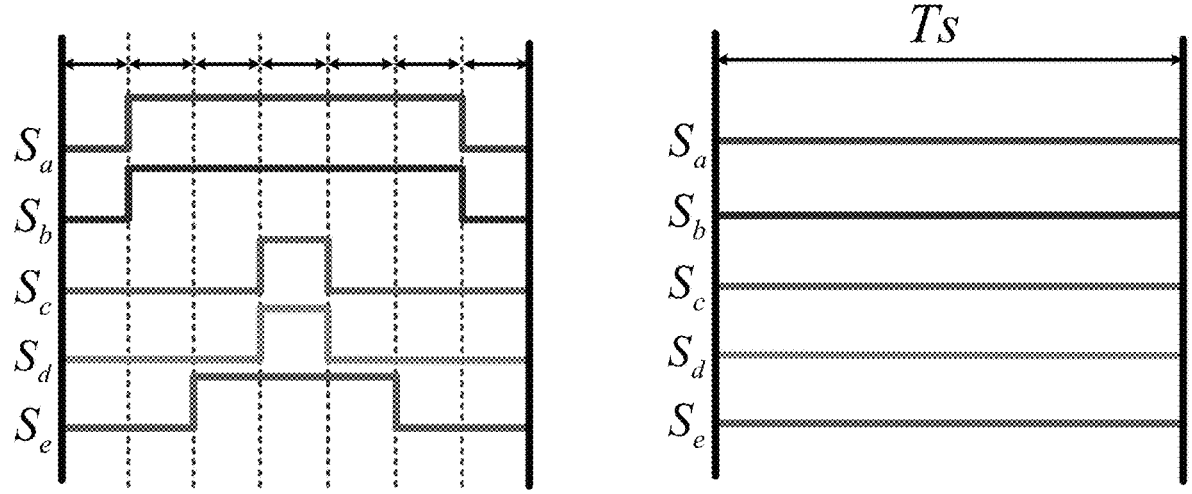
FIG. 9 Switching sequence of dual inverter output when inverter 1 acts alone.

As shown in FIG. 8, the virtual voltage vector provided by inverter 1 can no longer meet the current state of the motor. Inverter 1 outputs the maximum voltage vector, and inverter 2 provide the remaining current increment, to achieve the expected given value.

Step 4.4) According to the two different working conditions in Step 4.3), the currents of the q-axis and d-axis in the motor rotating coordinate system at time k+2 is substituted into the cost function to obtain the expected voltage vector:

$$\lambda(i,j) = (i_d^* - i_d(k+2))^2 + (i_q^* - i_q(k+2))^2$$

Figure 10:
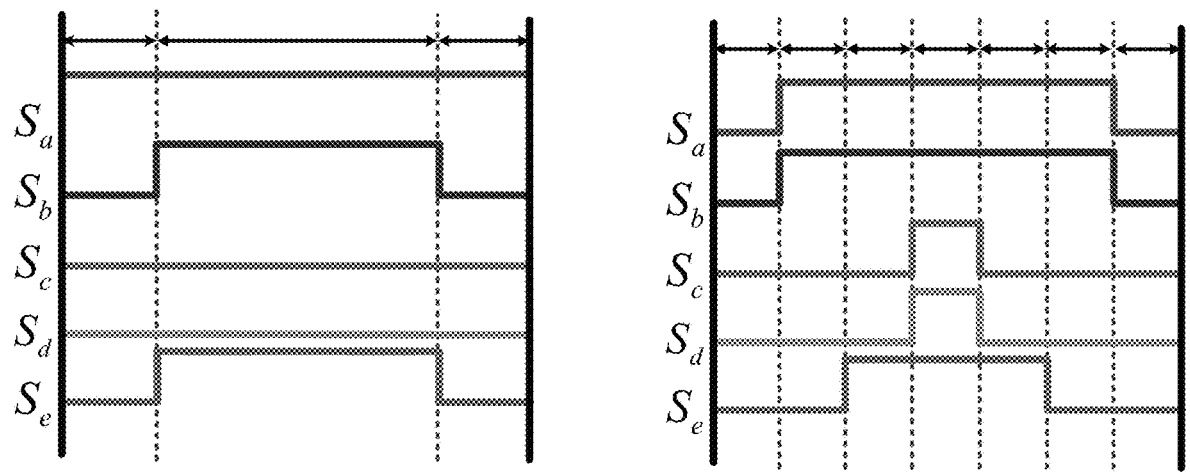
FIG. 10 Switching waveforms when inverter 1 and inverter 2 are superimposed.

Step 5.1) According to Step 4), the index number i of the optimal voltage vector has been found. The scale factor $DR0_{INV1}$ and $DR_{INV1}$ for inverter 1, and the scale factor $DR0_{INV2}$ and $DR_{INV2}$ for inverter 2. Outputting the duty cycle of each phase of the open-winding inverter by the virtual voltage vector table of the open winding five-phase permanent magnet synchronous motor, the detail is proposed in Step 2;

If the $\Delta i_d^{INV1}$ and the $\Delta i_q^{INV1}$ are greater than the required increment $\Delta i_d^*$ and $\Delta i_q^*$ at the current moment, express the equation as:

$$\text{DutyRatio}_x^{INV1} = DR0_{INV1} \times (DR_{INV1} \times s_x^{INV1}(i) + (1 - DR_{INV1}) \times s_x^{INV1}(j))$$

$$\text{DutyRatio}_x^{INV2} = 0$$

wherein $\text{DutyRatio}_x^{INV1}$ is the value calculated by the proposed algorithm, used for inverter 1 to generate the corresponding duty cycle waveform; $\text{DutyRatio}_x^{INV2}$ is used for inverter 2 to generate the corresponding duty cycle waveform; $s_x^{INV1}(i)$ is the first selected by inverter 1, is the switching function of a virtual voltage vector, wherein x=a,b,c,d,e; $s_x^{INV1}(j)$ is the switching function of the second virtual voltage vector selected by inverter 1, wherein x=a, b,c,d,e;

If the $\Delta i_d^{INV1}$ and the $\Delta i_q^{INV1}$ are less than the required increments $\Delta i_d^*$ and $\Delta i_q^*$ at this moment, express the equation as:

$$\text{DutyRatio}_x^{INV1} = s_x^{INV1}(i)$$

$$\text{DutyRatio}_x^{INV2} = DR0_{INV2} \times (DR_{INV2} \times s_x^{INV2}(i) + (1 - DR_{INV2}) \times s_x^{INV2}(j))$$

wherein $\text{DutyRatio}_x^{INV1}$ is the value calculated by the proposed algorithm for inverter 1 to generate the corresponding duty cycle waveform; $\text{DutyRatio}_x^{INV2}$ is used for inverter 2 to generate the corresponding duty cycle waveform; $s_x^{INV1}(i)$ is the first selected by inverter 1, is the switching function of a virtual voltage vector, wherein x=a,b,c,d,e; $s_x^{INV1}(i)$ is the first selected by inverter 1, is the switching function of a virtual voltage vector, wherein x-a,b,c,d,e; $s_x^{INV2}(j)$ is the switching function of the second virtual voltage vector selected by inverter 2, wherein x=a, b,c,d,e;

As shown in FIG. 10, the switching sequence on the left is the switching sequence of inverter 1, and the switching sequence on the right is the switching sequence of inverter 2. In the current working condition, inverter 1 outputs the maximum voltage vector and only switches twice in each control cycle, and inverter 2 normally outputs the switching waveform so that the overall switching loss of the drive system is reduced.

Step 5.2) Generating the pulse width modulation signal to the diver chip of the inverter by the obtained duty cycle of inverter 1 and the duty cycle of inverter 2 in Step 5.1). Finally, the corresponding voltage is output to the motor through the power semiconductor.

Figure 11:
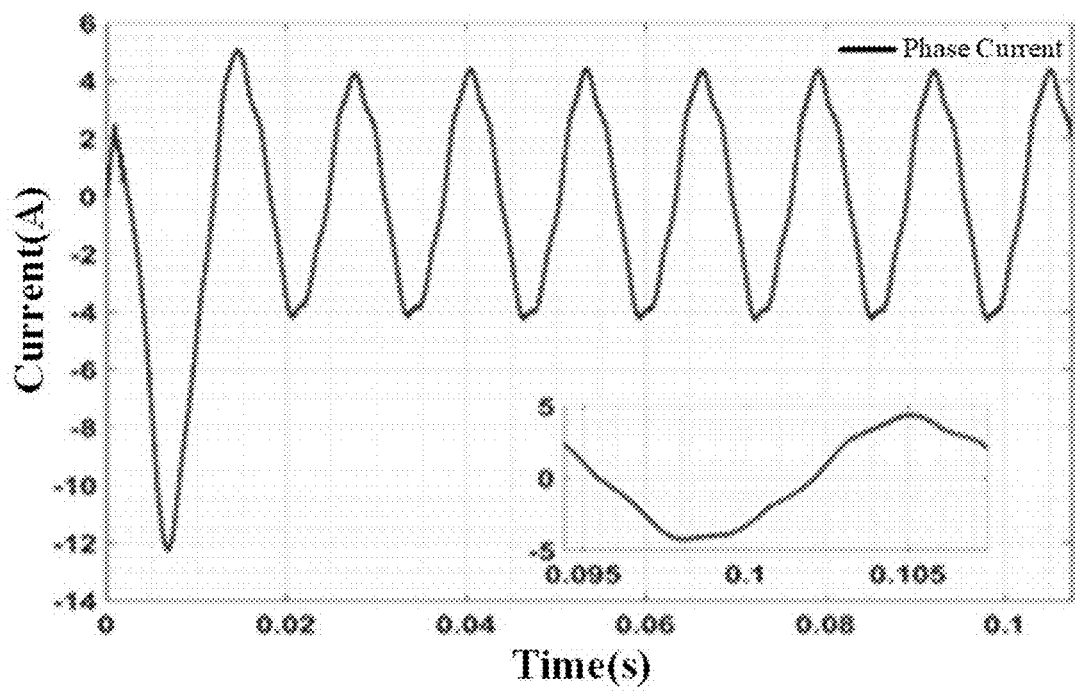
FIG. 11 The A-phase current waveform when inverter 1 alone acts.
Figure 12:
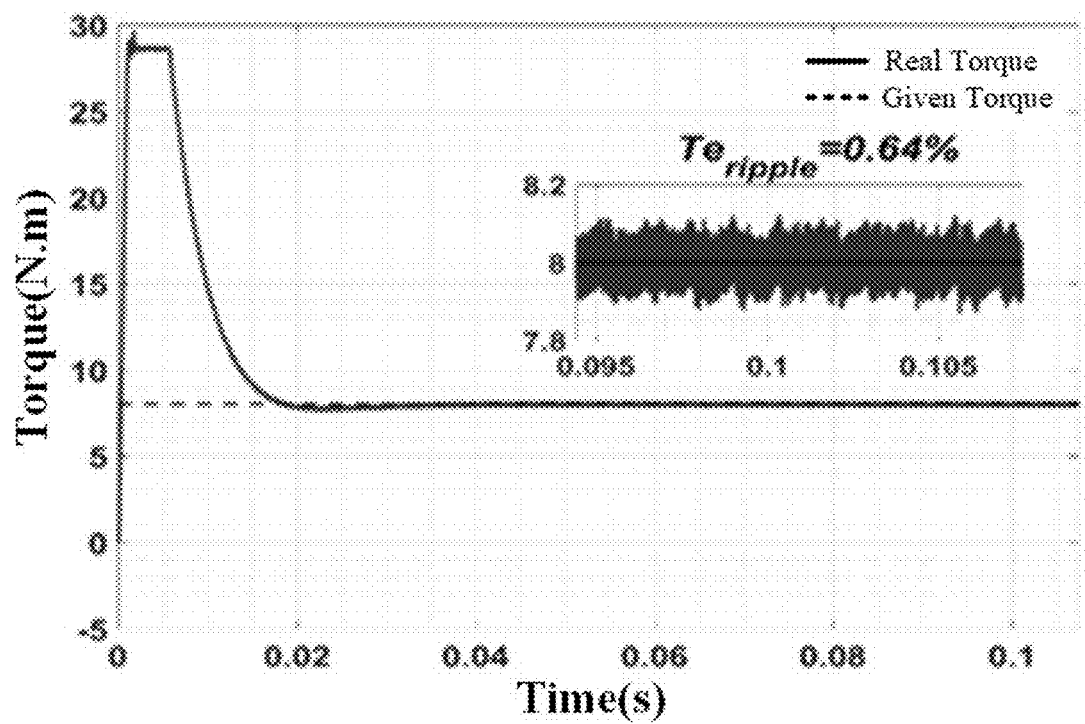
FIG. 12 The output torque when inverter 1 alone acts.
Figure 13:
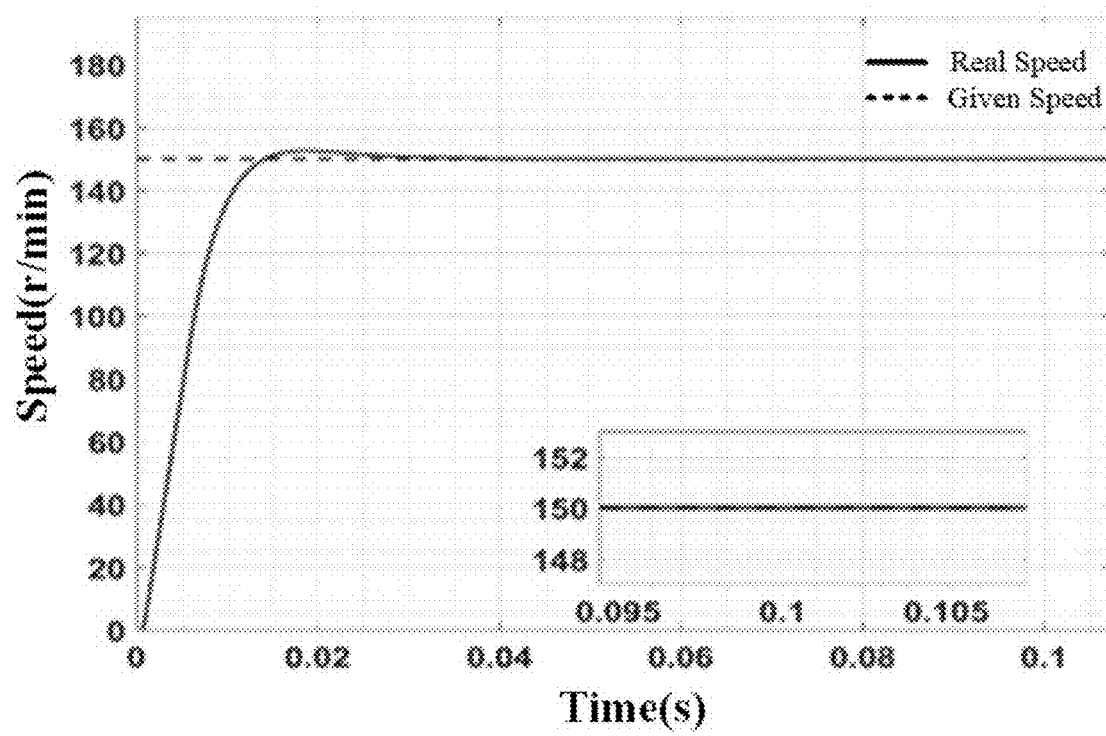
FIG. 13 The speed when inverter 1 alone acts.

FIG. 11-FIG. 13 show the simulated waveforms of phase A current, output torque, and speed when inverter 1 acts alone.

Figure 14:
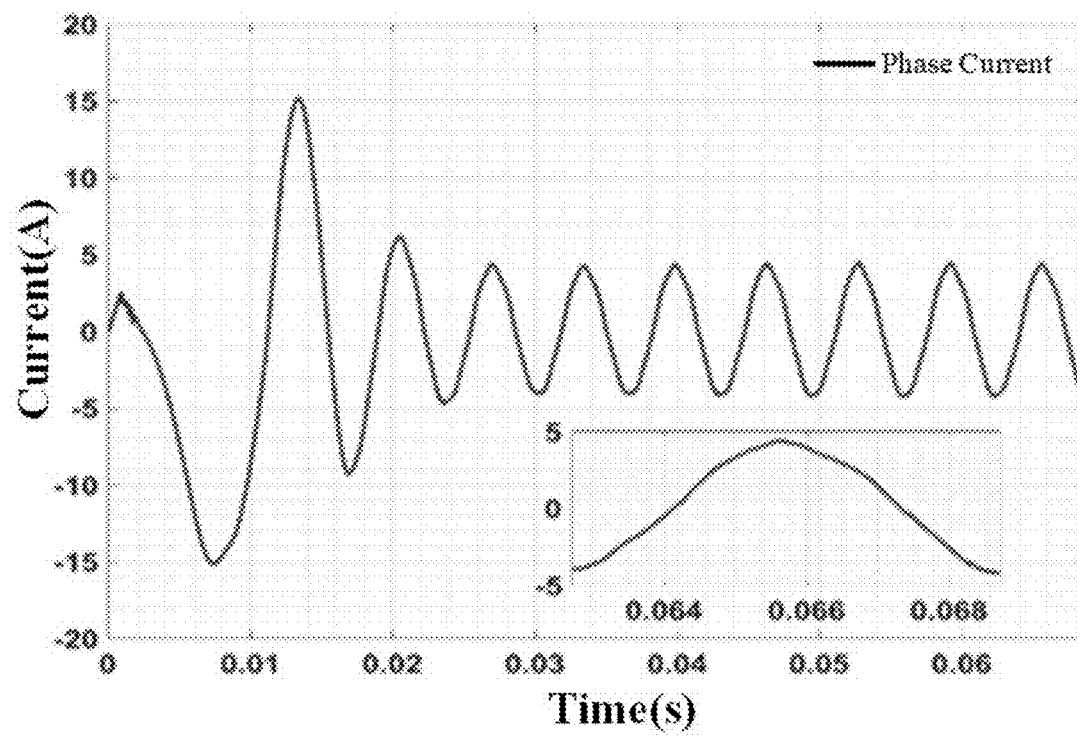
FIG. 14 The A-phase current when inverter 1 and inverter 2 superimpose.
Figure 15:
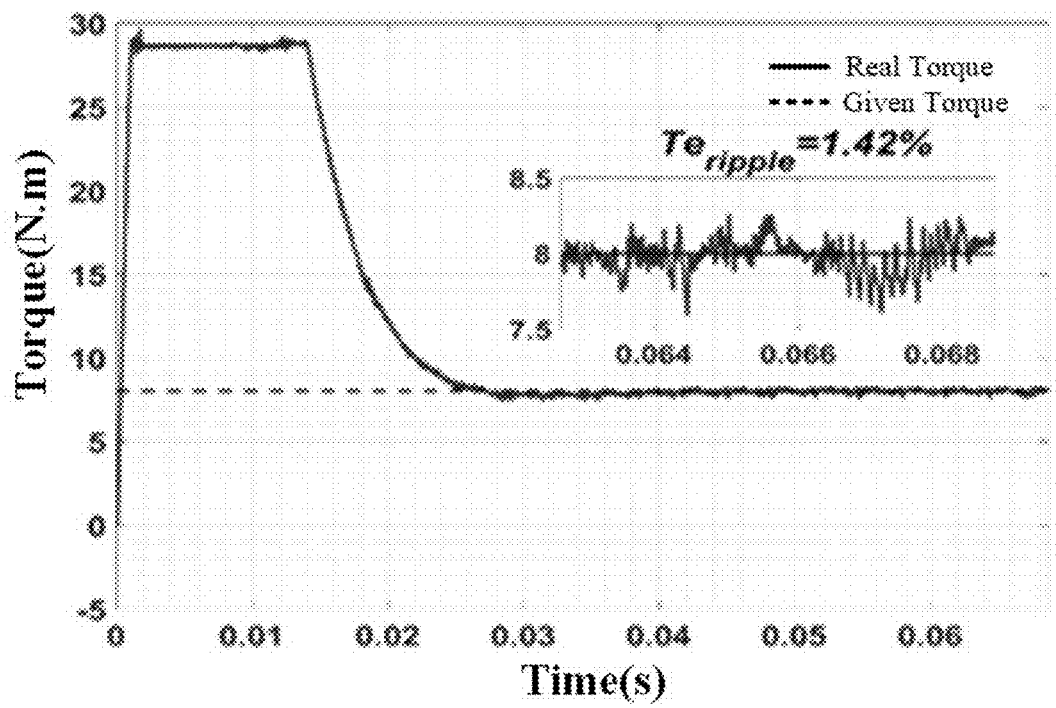
FIG. 15 The output torque when inverter 1 and inverter 2 superimpose.
Figure 16:
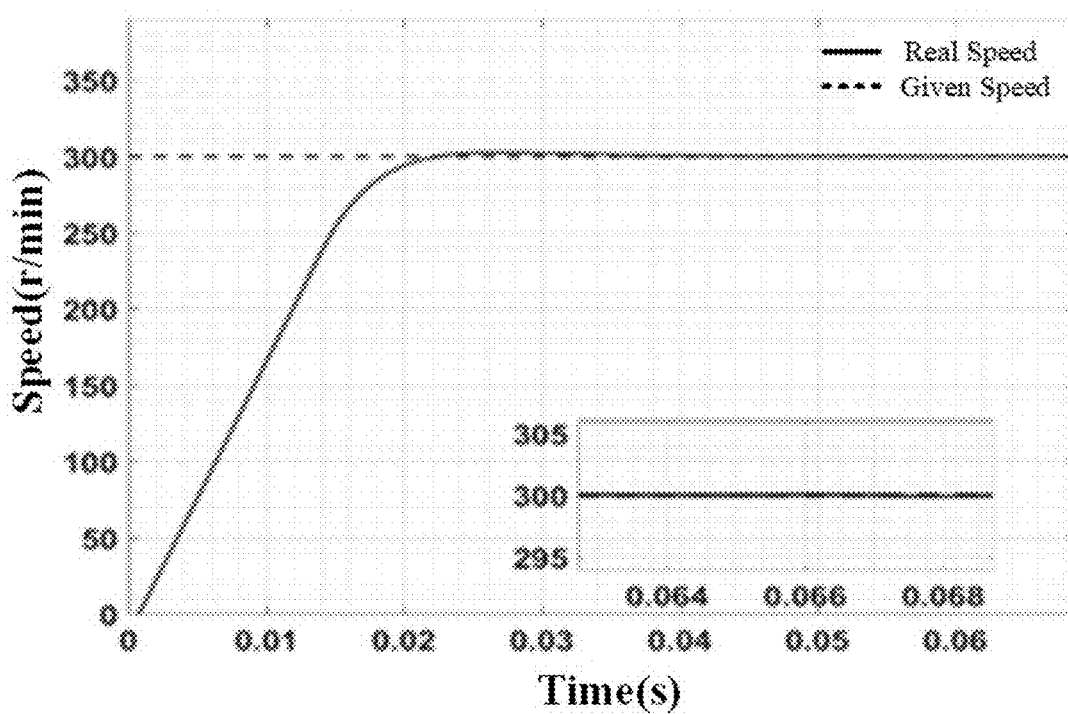
FIG. 16 The speed when inverter 1 and inverter 2 superimpose.
Figure 17A:
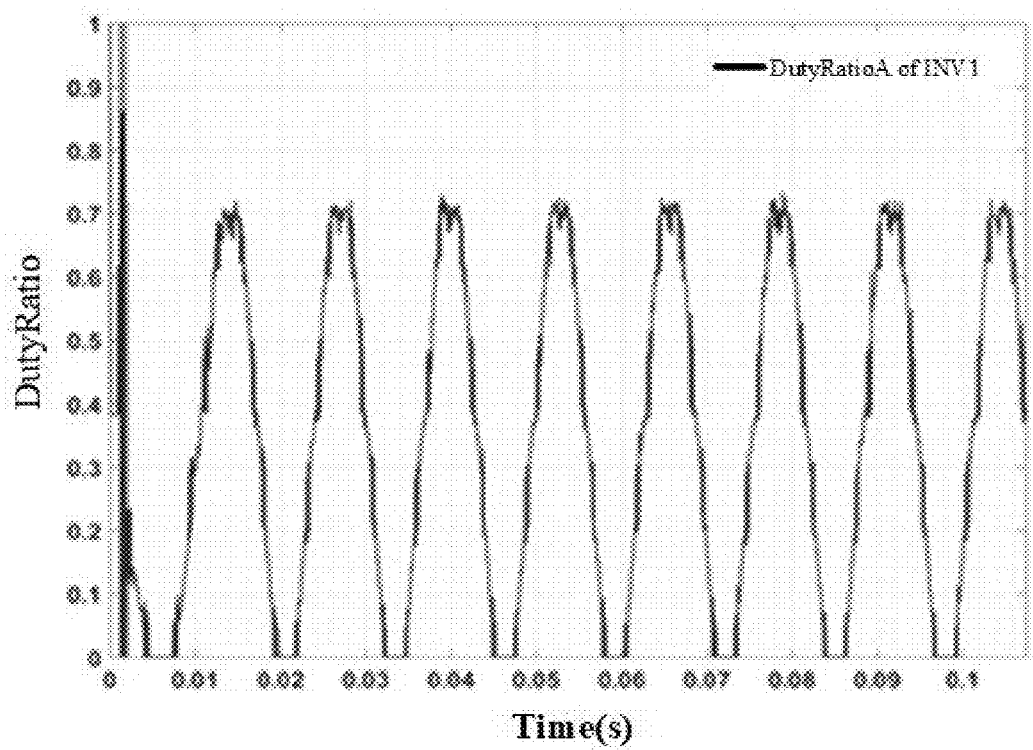
FIGS. 17A-17B Phase A duty cycle inverters 1 and 2 individually act; where
Figure 17B:
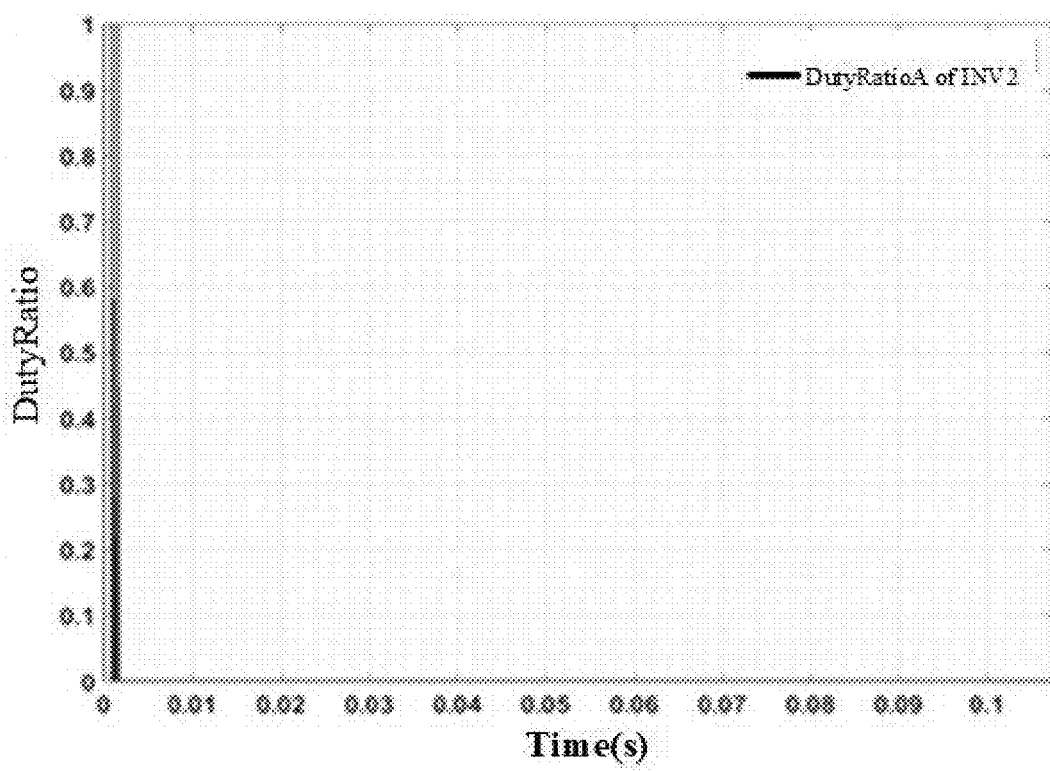
Figure 18A:
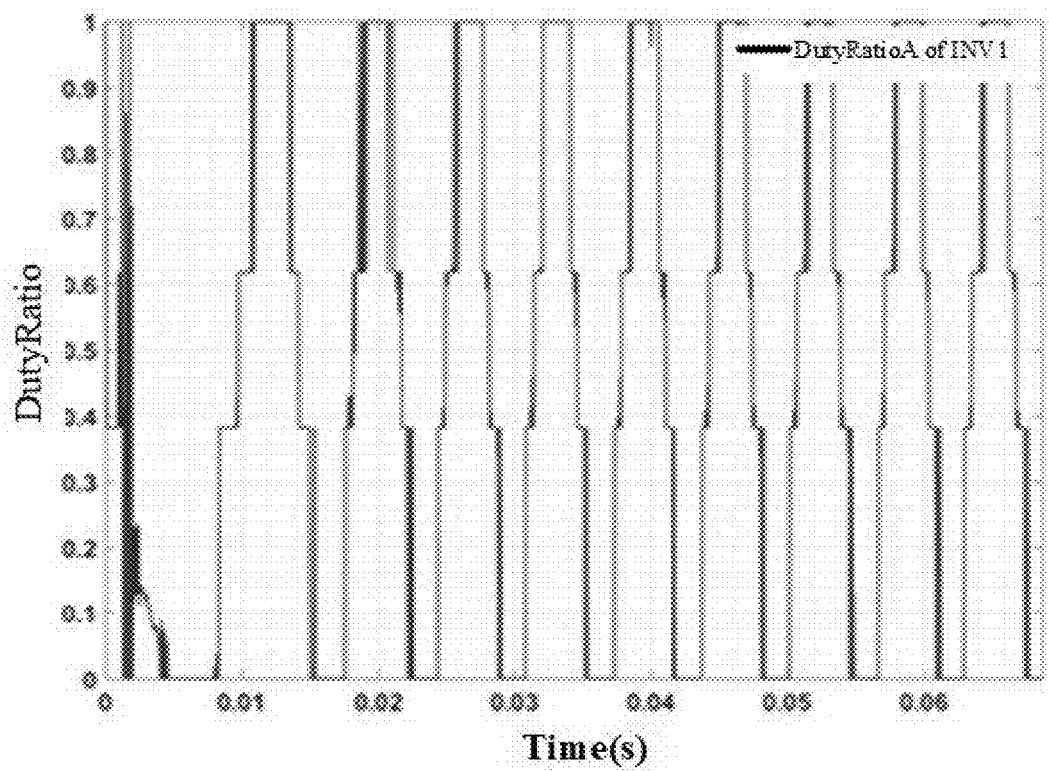
FIGS. 18A-18B A-phase duty cycle when inverter 1 and inverter 2 superimposed; where
Figure 18B:
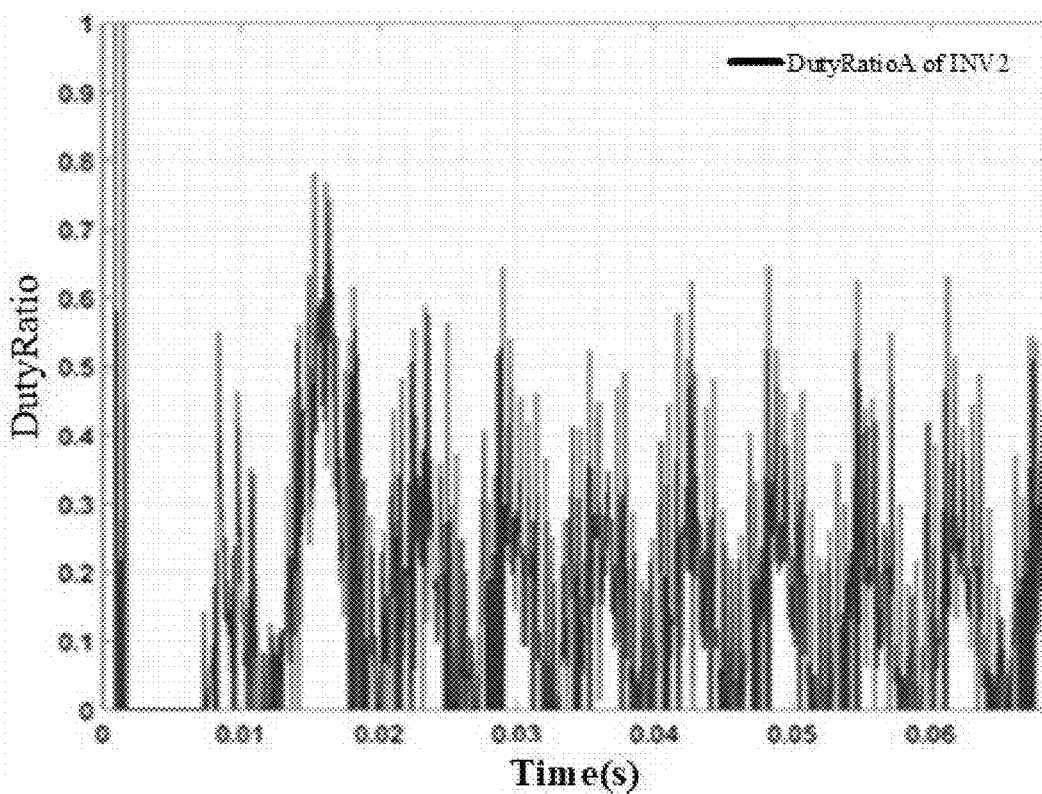

FIG. 14-FIG. 16 show the simulated waveforms of phase A current, output torque, and speed when inverters 1 and 2 are superimposed.

FIGS. 17A-17B and FIGS. 18A-18B respectively show the change of the A-phase duty cycle of inverter 1 when inverter 1 acts alone and when inverter 1 and inverter 2 are superimposed on each other.

Figure 19A:
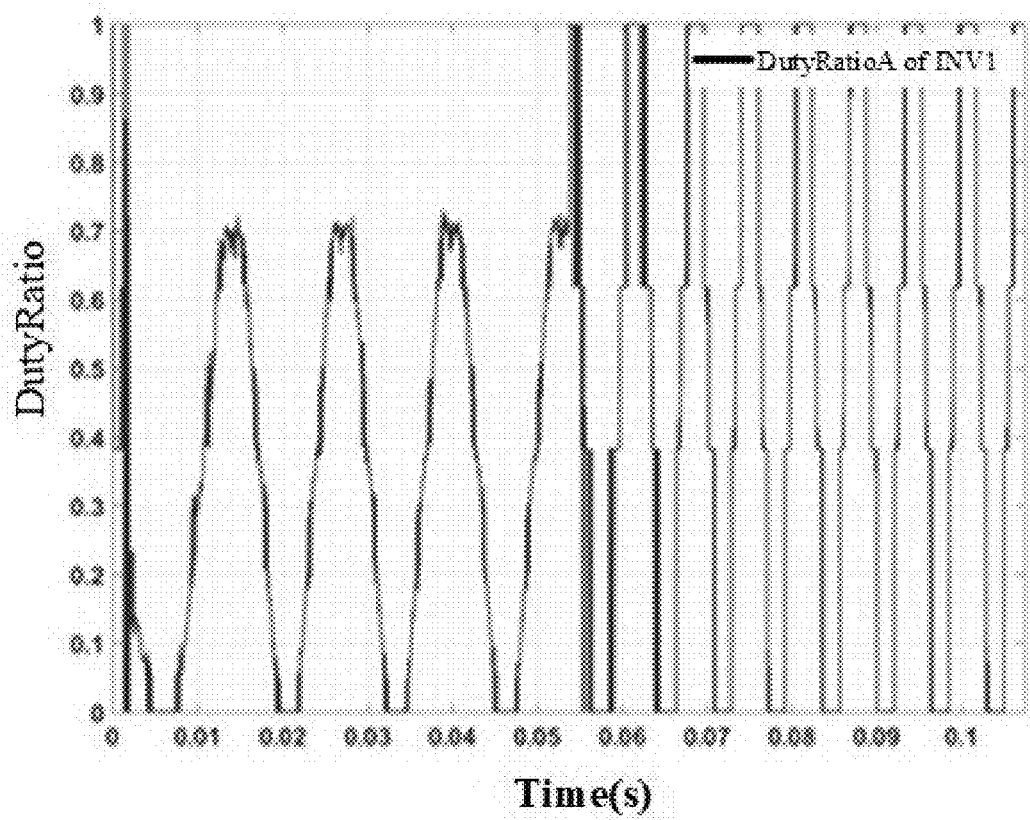
FIGS. 19A-19B Changes in the duty cycle of phase A under switching of operating conditions; where
Figure 19B:
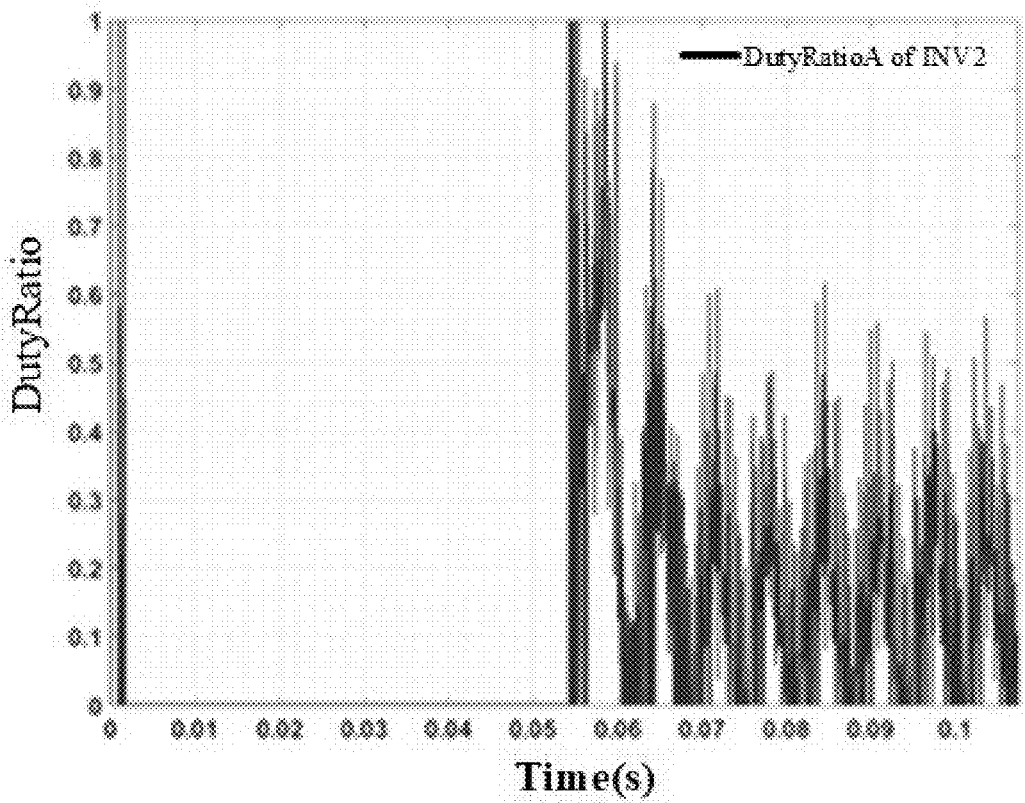

FIGS. 19A-19B show the change of the A-phase duty ratio of inverter 1 when the open-winding five-phase permanent magnet synchronous motor is switched from inverter 1 alone to inverter 1 and inverter 2 acts superimposed.

The present invention for open-winding five-phase permanent magnet synchronous motors proposed by the present invention can reduce system losses, maximize the flexibility of the open-winding drive system from the above simulation waveforms. The vector traversal of 144 times is reduced to 24 times, reducing the amount of calculation.

The above embodiments are only used to illustrate the design ideas and features of the present invention. The purpose is to enable those skilled in the art to understand the content of the present invention and implement them accordingly. The protection scope of the present invention is not limited to the above embodiments. Therefore, all equivalent changes or modifications made according to the principles and design ideas disclosed in the present invention fall within the protection scope.

Although the embodiments of the present invention have been shown and described, those of ordinary skill in the art can understand that various changes, modifications, substitutions, and modifications can be made to these embodiments without departing from the principle and purpose the present invention. The claims and their equivalents define the scope of the present invention.

What is claimed is:

1. A model predictive decomposition control method for an open-winding five-phase permanent magnet synchronous motor, comprising the following steps:
   step 1) obtaining a d-axis current and a q-axis current in fundamental space of the open-winding five-phase permanent magnet synchronous motor in a rotating coordinate system as a given value for a control system;
   step 2) constructing a virtual voltage vector table of the open-winding five-phase permanent magnet synchronous motor in a static coordinate system; applying a label of a virtual voltage vector in a previous control cycle, and calculating a voltage in the static coordinate system; and obtaining a back electromotive force of the motor according to a mathematical model of the motor;
   step 3) using the Euler forward difference prediction equation to find the q-axis current and the d-axis current in this period;
   step 4) substituting the voltage vector provided by an inverter 1 into the predictive model and a cost function in the current sampling period, finding the current of the q-axis and the d-axis of the rotating coordinate system in the next period; if the voltage vector provided by inverter 1 meets the requirements of a drive system, an inverter 2 is closed; otherwise, an inverter 1 is clamped to the maximum voltage vector, and inverter 2 provides an increment of the remaining pail; and step 5) transmitting the selected voltage vector and its corresponding duty cycle signal into the open-winding inverter.

2. The model predictive decomposition control method for the open-winding five-phase permanent magnet synchronous motor according to claim 1; wherein in step 1); calculating a speed error between a given speed n* and an actual speed n of the motor in real-time to obtain a required q-axis current reference value $i_q$* by a proportional-integral controller and the d-axis current reference value $i_d$*=0.

3. The model predictive decomposition Control method for the open-winding five-phase permanent magnet synchronous motor according to claim 1, wherein in step 2):

step 2.1) constructing an open-winding five-phase permanent magnet synchronous motor virtual voltage vector table; expressing the voltage vector generated by the five-phase voltage source inverter in the stationary coordinate system as:

$$u_s = \frac{2}{5} \times (s_a + s_b w + s_c w^2 + s_d w^3 + s_e w^4) \times U_{dc}$$

$$\left(w = e^{j\frac{2}{5}\pi}\right)$$

wherein, $U_{dc}$ is the DC bus voltage; $u_s$ is the voltage vector in the static coordinate system; $s_i$(i=a,b,c,d,e) is the switching function of each bridge arm; when the upper bridge arm is turned on, $s_i$=1; when the lower bridge arm is turned on, $s_i$=0; and step 2.2) according to a size of a voltage vector length, divide the voltage vector obtained from step 1) into large vector $u_B$, medium vector $u_M$, small vector $u_L$, and zero vector $u_0$; constructing the virtual voltage vectors of the open winding five-phase permanent magnet synchronous:

$$VV_i(u_B, u_L) = 0.618 \times u_M + (1-0.618) \times u_B$$

wherein the scale factor 0.618 of the two voltage vectors makes the voltage vector of a five-phase permanent magnet synchronous motor equivalent to zero in the harmonic subspace;

step 2.3) expressing the voltage vector output value of the previous sampling period (k−1) as:

$$u_s(k-1) = \frac{2}{5} \times (s_a(k-1) + s_b(k-1)w + s_c(k-1)w^2 + s_d(k-1)w^3 + s_e(k-1)w^4) \times U_{dc}$$

$$\left(w = e^{j\frac{2}{5}\pi}\right)$$

furthermore, the $i_q$* and the actual speed co of the motor are calculated using step 1); hence, the instantaneous value of the q-axis and the d-axis back electromotive force of the open-winding five-phase permanent magnet synchronous motor in the rotating coordinate system at this time is expressed as:

$$\begin{cases} EMF_d = \omega \times L_s \times i_q^* \\ EMF_q = \omega \times L_s \times i_d^* + \omega \times \varphi_f \end{cases}$$

wherein Ls is the inductance of the motor, $\varphi_f$ is the permanent magnet flux linkage of the motor, iq* is the q-axis current reference value in the rotating coordinate system, and id* is the d-axis current reference value in the rotating coordinate system.

4. The model predictive decomposition control method for the open-winding five-phase permanent magnet synchronous motor according to claim 1, wherein in step 3):

step 3.1) expressing the voltage equation in the rotating coordinate system of the five-phase permanent magnet synchronous motor as:

$$\begin{cases} \frac{di_d}{dt} = \frac{1}{L_s} \times (u_d - R_s \times i_d - \omega_e \times L_s \times i_q) \\ \frac{di_q}{dt} = \frac{1}{L_s} \times (u_d - R_s \times i_d - \omega_e \times L_s \times i_d - \omega_e \times \varphi_j) \end{cases}$$

wherein, $L_s$ is the inductance of the motor, $R_s$ is the stator resistance of the motor, $u_d$ is the voltage on the d-axis, $u_q$ is the voltage on the q-axis, $i_d$ is the d-axis current, and $i_q$ is the q-axis current, $\omega_e$ is the electrical angle of the motor, $\varphi_f$ is the permanent magnet flux linkage of the motor; and step 3.2) using an Euler forward difference method to find the currents of the q-axis and d-axis in the rotating coordinate system at time k+1:

$$\begin{cases} \frac{i_d(k+1) - i_d(k)}{Ts} = \frac{1}{L_s} \times (u_d(k) - R_s \times i_d(k) - EMF_d(k)) \\ \frac{i_q(k+1) - i_q(k)}{Ts} = \frac{1}{L_s} \times (u_q(k) - R_s \times i_q(k) - EMF_q(k)) \end{cases}$$

wherein $u_d(k)$ is the voltage on the d-axis at time k, $u_q(k)$ is the voltage on the q-axis at time k, $i_d(k)$ is the d-axis current, and $i_q(k)$ is the q-axis current, $EMF_d(k)$ is the d-axis back EMF of the motor at time k, and $EMF_q(k)$ is the q-axis back EMF of the motor at time k.

5. The model predictive decomposition control method for the open-winding five-phase permanent magnet synchronous motor according to claim 1, wherein in step 4):

step 4.1) according to the mathematical model of the motor, the currents of the q-axis and the d-axis in the rotating coordinate system at time k+1 is the sum of two inverters:

$$\begin{cases} u_d(k+1) = u_d^{INV1}(k+1) - u_d^{INV2}(k+1) \\ u_q(k+1) = u_q^{INV1}(k+1) - u_q^{INV2}(k+1) \end{cases}$$

wherein, $u_{INV1_d}(k+1)$ is the d-axis voltage in the rotating coordinate system provided by inverter 1 at k+1 instance, $u_{INV1_q}(k+1)$ is the q-axis voltage in the rotating coordinate system provided by inverter 1 at k+1 instance, $u_{INV2_d}(k+1)$ is the d-axis voltage in the rotating coordinate system provided by inverter 2 at k+1 instance, $u_{INV2_q}(k+1)$ is the q-axis voltage in the rotating coordinate system provided by inverter 2 at k+1 instance;

step 4.2) expressing the voltage vectors provided by inverter 1 and inverter 2 as:

$$\begin{cases} \Delta i_d^{INV1} = \dfrac{Ts}{L_s} \times \left(u_d^{INV1}(k+1) - R_s \times i_d(k+1) - EMF_d(k+1)\right) \\ \Delta i_q^{INV1} = \dfrac{Ts}{L_s} \times \left(u_d^{INV1}(k+1) - R_s \times i_q(k+1) - EMF_q(k+1)\right) \end{cases}$$

$$\begin{cases} \Delta i_d^{INV2} = -\dfrac{Ts}{L_s} \times u_d^{INV2}(k+1) \\ \Delta i_q^{INV2} = -\dfrac{Ts}{L_s} \times u_d^{INV2}(k+1) \end{cases}$$

wherein $\Delta i_{INV1_d}$ and $\Delta i_{INV1_q}$ are d-axis current and q-axis currents in the rotating coordinate system generated by the inverter 1; Rs is the phase resistance of the motor windings; Ts is the control period of the controller; Ls is the stator inductance of the motor; $EMF_d(k+1)$ is the d-axis back-EMF of the motor at the k+1 instance; $EMF_q(k+1)$ is the q-axis back-EMF of the motor at the k+1 instance;

step 4.3) traversing the virtual voltage vector generated by inverter 1 to predict the q-axis current and d-axis currents in the rotating coordinate system of the five-phase permanent magnet synchronous motor at time k+2, if a $\Delta i_{INV1_d}$ and a $\Delta i_{INV1_q}$ is greater than or equal to the incremental requirement $\Delta i_d^*$ and $\Delta i^*_q$ at this moment, the voltage vector provided by inverter 1 is enough, and the inverter 2 is turned off; by applying multiple voltage vectors in one control period, express the voltage vector in the rotating coordinate system generated in the current sampling period as:

$$\begin{cases} u_\alpha^{INV1} = DR0_{INV1} \times \left(DR_{INV1} \times \mathrm{real}(VV_i^{INV1}) + (1 - DR_{INV1}) \times \mathrm{real}(VV_j^{INV1})\right) \\ u_\beta^{INV1} = DR0_{INV1} \times \left(DR_{INV1} \times imag(VV_i^{INV1}) + (1 - DR_{INV1}) \times imag(VV_j^{INV1})\right) \end{cases}$$

$$\begin{cases} u_\alpha^{INV2} = 0 \\ u_\beta^{INV2} = 0 \end{cases}$$

wherein, $u_{INV1\ \alpha}$, $u_{INV1\ \beta}$, $u_{INV2\ \alpha}$, and $u_{INV2\ \beta}$ are the voltage vector in the stationary coordinate system selected by inverter 1 and inverter 2, respectively, distinguishing by superscripts; $\mathrm{real}(VV_{INV1_i})$ and $\mathrm{imag}(VV_{INV1_i})$ are the real and imaginary parts of the first virtual voltage vector to be selected by inverter 1 at this moment; $\mathrm{real}(VV_{INV1_j})$ and $\mathrm{imag}(VV_{INV1_j})$ are the real and imaginary parts of the second voltage vector to be selected by inverter 1; $DR0_{INV1}$ is the scale factors for the sum of the effective voltage vectors of inverter 1; $DR_{INV1}$ is the scale factor between two effective voltage vectors inverter 1;

expressing the scale factors of inverter 1 and inverter 2 when the increment provided by inverter 1 meets the current needs as:

$$\begin{cases} DR0_{INV1} = m(0 \le m \le 1) \\ DR_{INV1} = n(0 \le n \le 1) \end{cases}$$

$$\begin{cases} DR0_{INV2} = 0 \\ DR_{INV2} = 0 \end{cases}$$

expressing a q-axis and a d-axis current in the rotating coordinate system of the motor at k+2 instance as:

$$\begin{cases} i_d(k+2) = i_d(k+1) + \dfrac{Ts}{L_s} \times \left(u_d^{INV1}(k+1) - R_s \times i_d(k+1) - EMF_d(k+1)\right) \\ i_q(k+2) = i_q(k+1) + \dfrac{Ts}{L_s} \times \left(u_d^{INV1}(k+1) - R_s \times i_q(k+1) - EMF_q(k+1)\right) \end{cases}$$

if a $\Delta i_{INV1_d}$ and a $\Delta i_{INV1_q}$ are less than the incremental required $\Delta i_d^*$ and $\Delta i^*_q$ at the current moment, the required voltage vector is beyond the output capacity of the inverter 1; furthermore, inverter 2 must output the remaining increments to meet the motor operating conditions; in this situation, inverter 1 outputs the maximum increments of $\Delta i_{INV1_d}$ and $\Delta i_{INV1_q}$, inverter 2 acts on multiple voltage vectors in the current period; express the voltage vector in the rotating coordinate system generated in the current sampling period as:

$$\begin{cases} u_\alpha^{INV1} = \mathrm{real}(VV_i^{INV1}) \\ u_\beta^{INV1} = imag(VV_i^{INV1}) \end{cases}$$

$$\begin{cases} u_\alpha^{INV2} = DR0_{INV2} \times \left(DR_{INV2} \times \mathrm{real}(VV_i^{INV2}) + (1 - DR_{INV2}) \times \mathrm{real}(VV_j^{INV2})\right) \\ u_\beta^{INV2} = DR0_{INV2} \times \left(DR_{INV2} \times imag(VV_i^{INV2}) + (1 - DR_{INV2}) \times imag(VV_j^{INV2})\right) \end{cases}$$

wherein, $u_{INV1\ \alpha}$, $u_{INV1\ \beta}$, $u_{INV2\ \alpha}$, and $u_{INV2\ \beta}$ are the voltage vector in the stationary coordinate system selected by inverter 1 and inverter 2, respectively, distinguishing by superscripts; $\mathrm{real}(VV_{INV1_i})$ and $\mathrm{imag}(VV_{INV1_i})$ are the real and imaginary parts of the first virtual voltage vector to be selected by inverter 1 at this moment; $\mathrm{real}(VV_{INV2_i})$ and $\mathrm{imag}(VV_{INV2_i})$ are the real and imaginary parts of the first candidate voltage vector of inverter 2; $\mathrm{real}(VV_{INV2_j})$ and $\mathrm{imag}(VV_{INV2_j})$ are the real and imaginary parts of the second candidate voltage vector of inverter 2 respectively; $DR0_{INV2}$ is the scale factor for the sum of the effective voltage vectors action; $DR_{INV2}$ is the scale factor between the two effective voltage vector;

expressing the scale factors of inverter 1 and inverter 2 when the increment provided by inverter 1 is less than needed as:

$$\begin{cases} DR0_{INV1} = 1 \\ DR_{INV1} = 1 \end{cases}$$

$$\begin{cases} DR0_{INV2} = m(0 \le m \le 1) \\ DR_{INV2} = n(0 \le n \le 1) \end{cases}$$

$$\begin{cases} DR0_{INV1} = 1 \\ DR_{INV1} = 1 \end{cases}$$

$$\begin{cases} DR0_{INV2} = m(0 \le m \le 1) \\ DR_{INV2} = n(0 \le n \le 1) \end{cases}$$

expressing the q-axis and d-axis current in the rotating coordinate system of the motor at k+2 instance as:

$$\begin{cases} i_d(k+2) = i_d(k+1) + \dfrac{Ts}{L_s} \times \left(u_d^{INV1}(k+1) - R_s \times i_d(k+1) - EMF_d(k+1)\right) \\ -\dfrac{Ts}{L_s} \times u_d^{INV2}(k+1) \\ i_q(k+2) = i_q(k+1) + \dfrac{Ts}{L_s} \times \left(u_d^{INV1}(k+1) - R_s \times i_q(k+1) - EMF_q(k+1)\right) \\ -\dfrac{Ts}{L_s} \times u_d^{INV2}(k+1) \end{cases}$$

step 4.4) according to the two different working conditions in step 4.3), substituting the q-axis and d-axis current in the rotating coordinate system of the motor at k+2 instance into the cost function to obtain the expected voltage vector:

$\lambda(i,j)=(i_d{}^*-i_d(k+2))^2+(i_q{}^*-i_q(k+2))^2$.

6. The model predictive decomposition control method for the open-winding five-phase permanent magnet synchronous motor according to claim 1, wherein in step 5):

step 5.1) according to step 4), the index number i of the optimal voltage vector has been found; the scale factor $DR0_{INV1}$ and $DR_{INV1}$ for inverter 1, and the scale factor $DR0_{INV2}$ and $DR_{INV2}$ for inverter 2; outputting the duty cycle of each phase of the open-winding inverter by the virtual voltage vector table of the open winding five-phase permanent magnet synchronous motor, the detail is proposed in step 2;

if the $\Delta i_{INV1_d}$ and the $\Delta i_{INV1_q}$ are greater than the required increment $\Delta i_d{}^*$ and $\Delta i^*_q$ at the current moment, express the equation as:

$DutyRatio_x^{INV1} = DR0_{INV1} \times (DR_{INV1} \times s_x^{INV1}(i) + (1 - DR_{INV1}) \times s_x^{INV1}(j))$ $DutyRatio_x^{INV2} = 0$ wherein $DutyRatio_{INV1_x}$ is the value calculated by the proposed algorithm, used for inverter 1 to generate the corresponding duty cycle waveform; $DutyRatio_{INV2_x}$ is used for inverter 2 to generate the corresponding duty cycle waveform; $s_{INV1_x}(i)$ is the first selected by inverter 1, is the switching function of a virtual voltage vector, wherein x=a,b,c,d,e; $s_{INV1_x}(j)$ is the switching function of the second virtual voltage vector selected by inverter 1, Wherein x=a,b,c,d,e;

if the $\Delta i_{INV1_d}$ and the $\Delta i_{INV1_q}$ are less than the required increment $\Delta i_d{}^*$ and $\Delta i^*_q$ at this moment, expressing the equation as:

$DutyRatio_x^{INV1} = s_x^{INV1}(i)$ $DutyRatio_x^{INV2} = DR0_{INV2} \times (DR_{INV2} \times s_x^{INV2}(i) + (1 - DR_{INV2}) \times s_x^{INV2}(j))$ wherein $DutyRatio_{INV1_x}$ is the value calculated by the proposed algorithm for inverter 1 to generate the corresponding duty cycle waveform; $DutyRatio_{INV2_x}$ is used for inverter 2 to generate the corresponding duty cycle waveform; $s_{INV1_x}(i)$ is the first selected by inverter 1, is the switching function of a virtual voltage vector, wherein x=a,b,c,d,e; $s_{INV2_x}(i)$ is the first selected by inverter 1, is the switching function of a virtual voltage vector, wherein x=a,b,c,d,e; $s_{INV2_x}(j)$ is the switching function of the second virtual voltage vector selected by inverter 2, wherein x=a,b,c,d,e;

step 5.2) Generating the pulse width modulation signal to a driver chip of the inverter by the obtained duty cycle of inverter 1 and the duty cycle of inverter 2 in step 5.1); finally, the corresponding voltage is output to the motor through a power semiconductor.

\* \* \* \* \*